United States Patent [19]
Umezawa et al.

[11] Patent Number: 5,819,185
[45] Date of Patent: Oct. 6, 1998

[54] PORTABLE SATELLITE COMMUNICATION APPARATUS

[75] Inventors: Koichi Umezawa; Takashi Ohwada, both of Tokyo; Shiro Fujimori, Tokorozawa; Shiho Nakagawa, Yokohama; Minako Sasahara, Tokyo; Tohru Higashihara, Sayama, all of Japan

[73] Assignee: Hitachi, Ltd., Tokyo, Japan

[21] Appl. No.: 660,682

[22] Filed: Jun. 5, 1996

[30] Foreign Application Priority Data

Jun. 7, 1995 [JP] Japan ................................ 7-140522

[51] Int. Cl.$^6$ ........................................... H04B 1/08
[52] U.S. Cl. ............................ 455/575; 455/90; 455/97; 455/226.4; 455/226.2; 343/702
[58] Field of Search ........................... 455/3.2, 11.1, 455/575, 90, 572, 95, 97, 25, 12.1, 13.2, 121, 226.1, 226.4; 343/702, 765; 292/202; 70/208; 190/101, 118; 220/761, 4.02; 16/115; 364/708.1; 361/814

[56] References Cited

U.S. PATENT DOCUMENTS

| | | | |
|---|---|---|---|
| 4,881,258 | 11/1989 | Kaiwa et al. | 455/90 |
| 5,404,058 | 4/1995 | Nishijima | 327/332 |
| 5,519,405 | 5/1996 | Matsubara et al. | 342/359 |

FOREIGN PATENT DOCUMENTS

| | | | |
|---|---|---|---|
| 0 611 199 A1 | 8/1994 | European Pat. Off. | 455/121 |
| 0 626 764 A1 | 11/1994 | European Pat. Off. | 455/121 |

*Primary Examiner*—Amelia Au
*Attorney, Agent, or Firm*—Antonelli, Terry, Stout & Kraus, LLP

[57] ABSTRACT

A portable satellite communication apparatus constituted by a body portion and an antenna portion, wherein the antenna portion is attached on an azimuth angle adjustor provided on the body portion so that the upper surface of the antenna portion is made to be the transmission/reception direction of radio waves and the antenna portion is made rotatable so as to act also as a cover for covering the body portion. The antenna portion can be adjusted with respect to its azimuth angle, elevation angle and polarization angle. A panel portion and a handling instruction indicating portion are provided on the upper surface of the body portion and a lamp is provided on the antenna support portion so as to illuminate the panel portion and the handling instruction indicating portion to facilitate the handling of the apparatus in the night or the like. On the body portion, a handset storing portion which stores a handset for telephone call, and a panel portion provided with various indication portions, operation buttons, etc. are provided on the upper surface side; a handle for carrying the apparatus, and a buckle for fixing the antenna portion and the body portion with each other are provided on the front surface side; and a connector portion to which various connectors are to be connected is provided on the side surface side.

47 Claims, 18 Drawing Sheets

PORTABLE SATELLITE COMMUNICATION APPARATUS

BACKGROUND OF THE INVENTION

The present invention generally relates to a portable satellite communication apparatus, and particularly to a portable satellite communication apparatus which can be used rapidly, for example, in case of occurrence of a disaster or the like.

Generally, satellite communication is performed by using a communications satellite which is stationary above and relative to the earth. Accordingly, a ground station for the satellite communication is generally constituted by an antenna provided stationarily on the ground and a transmitter-receiver connected to the antenna.

Such an equipment for satellite communication has technical problems to be solved in that, for example, it is necessary to make the antenna direct to the communications satellite, it is necessary to perform communication through radio waves with weak electric field strength because the electric field strength of radio waves from a communications satellite is weak, and so on. Accordingly, a ground station is generally a large-sized one which is of a not-movable, stationary type.

It is considered that when a natural disaster, that is, a severe earthquake, occurred in Japan recently, communication equipment provided on the ground became impossible to use to cause a big barrier against prevention of a secondary disaster. In view of this fact, a demand for a small-sized and easily-portable satellite communication apparatus utilizing a communications satellite to perform communication becomes high in order to secure communication in case where various communication equipments on the ground become impossible to use due to a natural disaster or the like. However, there has been no suitable apparatus.

A portable satellite communication apparatus put in practical use is known, but in this apparatus, there is a problem that the setting of the apparatus, the operation for directing its antenna toward a communications satellite, etc. are difficult, and so on.

SUMMARY OF THE INVENTION

It is an object to provide a satellite communication apparatus which is small in size and high in operation control property. If the apparatus is small in size and high in operation control property, not only the apparatus can be used for ordinary communication but also it can be used rapidly in any place in case of occurrence of such a disaster as mentioned above or the like, and hence talk, data transmission, etc., can be easily performed, for example, between the apparatus and a stationary ground station which is a central station used by a disaster restoration center.

According to the present invention, the above object can be achieved by a portable satellite communication apparatus for performing communication through a communications satellite which comprises: a body portion provided therein with a transmission/reception circuit; an antenna portion attached to the body portion so as to be openable at its one side like a cantilever and so as to be adjustable with its azimuth and elevation angles for transmitting radio waves toward the communications satellite and for receiving radio waves from the communications satellite; and a handset; wherein at least a target azimuth/elevation indication means for indicating target azimuth and elevation angles of the antenna portion relative to the communications satellite and an actual azimuth indication means for indicating an actual azimuth angle of the body portion or the antenna portion are provided on the body portion.

In an embodiment which will be described later, in order to improve the operation control property, the target azimuth/elevation indication means and the actual azimuth indication means are disposed on this side on the upper surface of the body portion, and the handset is stored in a storing portion formed in the body portion so that the handset can be taken out freely from the storing portion. Further, in order to facilitate the operation to direct the antenna toward the satellite, a level for indicating the degree of level of body portion and an indication means for indicating the electric field strength of radio waves received from the communications satellite are provided on the upper surface of the body portion. Further, taking various environments of use into consideration, and in order to cope with various environments of use, terminals are provided on the body portion so that a battery of a car or a motorbike, a personal computer, a GPS, an external antenna, etc. may be connected to the terminals.

In the portable satellite communication apparatus according to the present invention, since a cover of the body portion constitutes the antenna portion and since the body portion is provided with the target azimuth/elevation indication means for indicating target azimuth and elevation angles of the antenna portion, the antenna portion can be set so as to direct toward the communications satellite rapidly and easily by being aided by the actual azimuth indication means and the target azimuth/elevation indication means, etc., after it is opened. Accordingly, even in case of an emergency such as occurrence of a disaster, or the like, it is possible to immediately secure the communication line from the area of the disaster.

In an embodiment which will be described later, the portable satellite communication apparatus according to the present invention has further functions as follows. For example, if a personal computer or the like is connected to the external connection terminal, it is possible to perform transmission and reception of data, and if an external antenna is used, it is possible to perform more stable communication. Further, if position data of the place where the apparatus is used is put from a GPS apparatus or the like, it is possible to indicate azimuth and elevation angles as the set direction of the antenna portion exactly, so that it is possible to set the antenna portion more easily.

DESCRIPTION OF THE PREFERRED EMBODIMENTS

Figure 1:
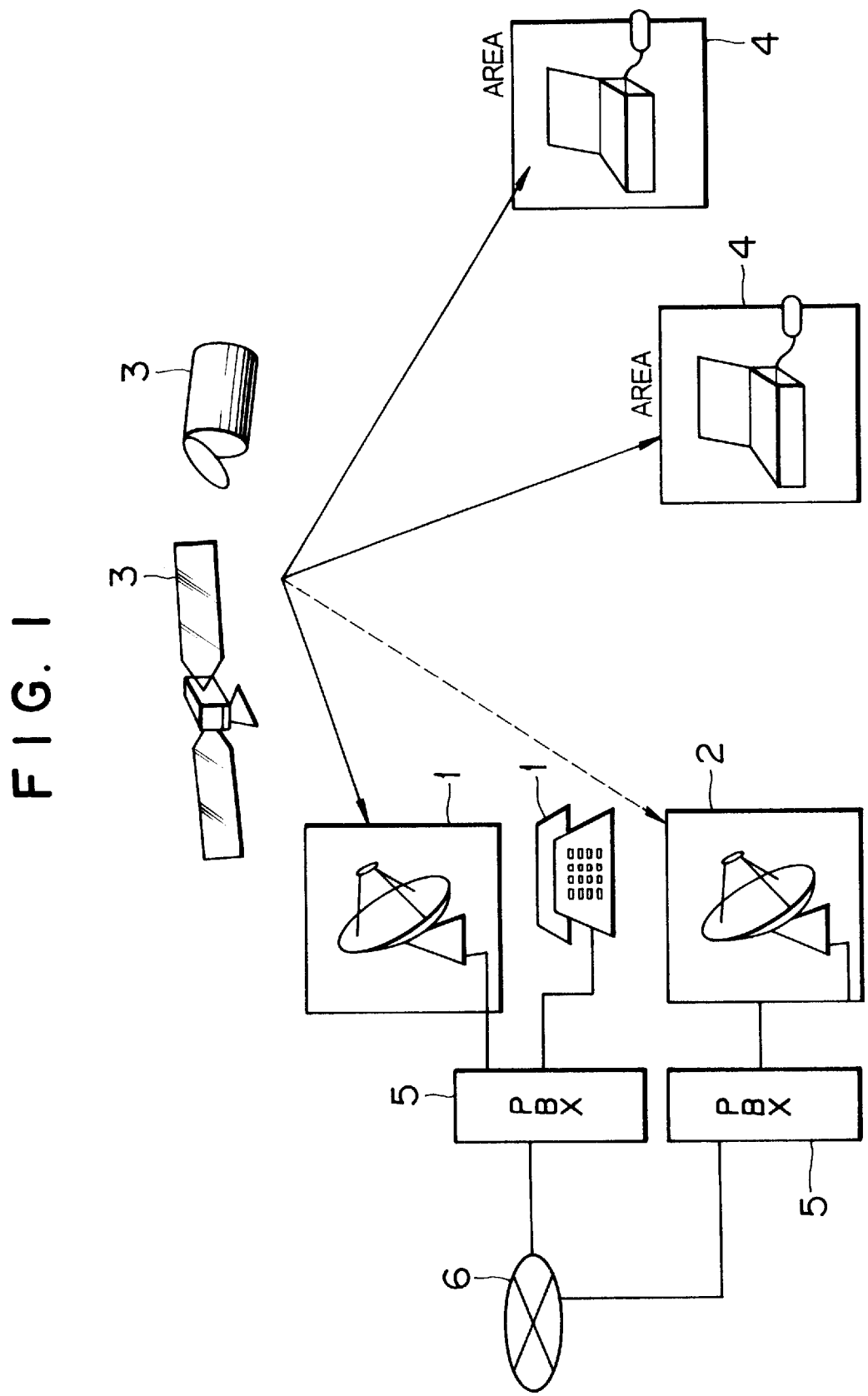
FIG. 1 is a conceptual diagram illustrating the configuration of a communication system using a portable satellite communication apparatus according to an embodiment of the present invention.

An embodiment of a portable satellite communication apparatus to which the present invention is applied will be described in detail with reference to the drawings. FIG. 1 is a block diagram illustrating an example of the configuration of a communication system using a portable satellite communication apparatus according to an embodiment of the present invention. In FIG. 1, the reference numeral 1 represents a center station; 2, a sub-center station; 3, a communication satellite; 4, portable satellite communication apparatuses; 5, a PBX; 6, a public communication network; and 7, a telephone. This system is illustrated as an example of the configuration of a system for establishing a communication link through a communications satellite between a portable satellite communication apparatus according to the embodiment of the present invention and a center station provided in a disaster prevention head-office or the like of a government, a local public organization or the like in case of occurrence of a disaster so that the disaster area can inform the head office of various information, or can receive various instructions from the head office. In the example shown in FIG. 1, a first disaster prevention head-office as a main one and a second disaster prevention head-office for making backup for the first disaster prevention head-office are provided as disaster prevention head-offices for performing command in the case of occurrence of a disaster, and the center station 1 and the sub-center station 2 for performing communication with the portable satellite communication apparatuses 4 according to the embodiment of the present invention through the communications satellite 3 are provided in each of these disaster prevention head-offices. In addition, assume that the portable satellite communication apparatuses 4 according to the embodiment of the present invention are to be carried to the disaster area by human bodies, bicycles, motorbikes, cars or the like, or to be distributed in advance to homes or the like of executives of a government or a local public organization who live near the area.

In FIG. 1, in case of occurrence of a disaster, in response to the start of business of the disaster prevention head-offices, the center station 1 or the sub-center station 2 establishes a communication link with the communications satellite 3, and waits for the start of communication from the portable satellite communication apparatuses 4 carried to the disaster area or the like. A worker having the portable satellite communication apparatus 4 carried to the disaster area or the like sets an antenna of the portable satellite communication apparatus 4, which is configured as described later, toward the satellite. Thereafter, the worker establishes a communication link with the communications satellite 3 and starts communication with the center station 1 or the sub-center station 2. The center station 1 and the sub-center station 2 are connected to the ordinary telephone 7 through the PBXes 5 respectively, and connected to the public communication network 6 through the PBXes 5. The sub-center station 2 performs backup when the center station 1 has a trouble or is in convergence of communication. In addition, each of these center stations 1 and 2 performs, through the communications satellite 3, communication and exchange messages and data with the portable satellite communication apparatuses 4 carried to the area; receives picture data; receives reports about information of conditions in the area from the portable satellite communication apparatuses 4, or gives proper instructions to the area; and performs relay of inter-communication between the portable satellite communication apparatuses 4 in the area or between each portable satellite communication apparatus 4 and another communication apparatus such as an ordinary telephone 7 through the PBX 5 and the public communication network 6.

Figure 2A:
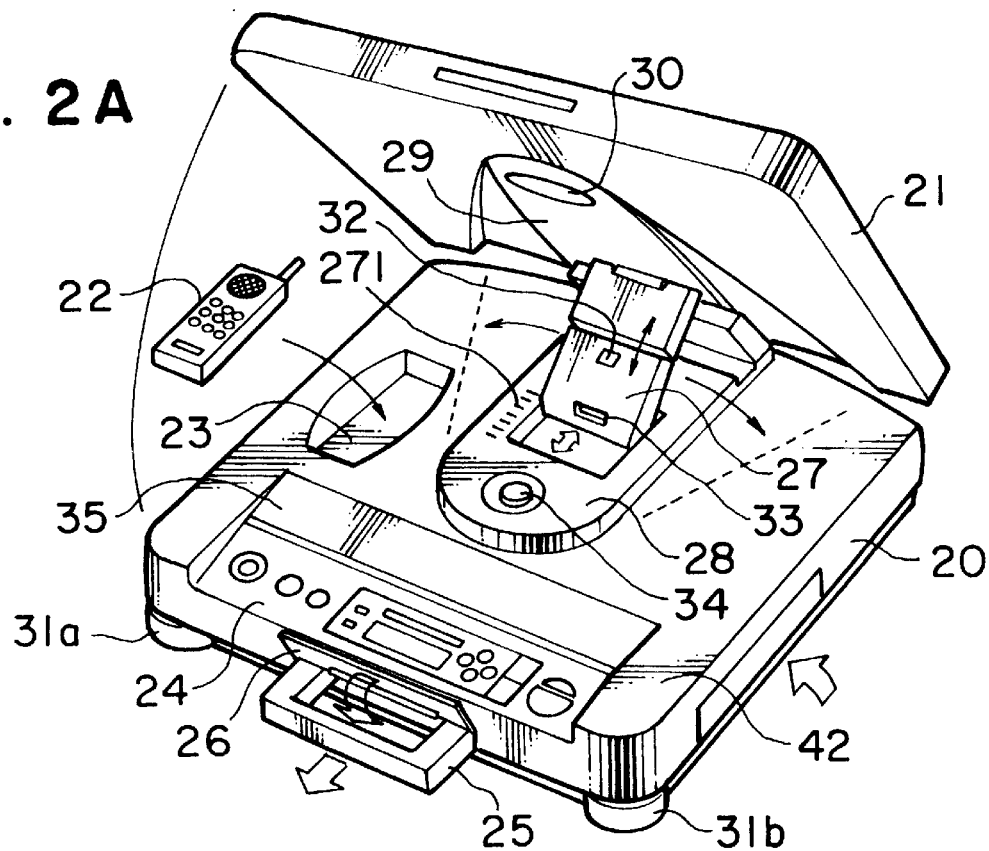
FIGS. 2A and 2B are perspective views, respectively, illustrating the external appearance of the portable satellite communication apparatus according to the embodiment of the present invention.
Figure 2B:
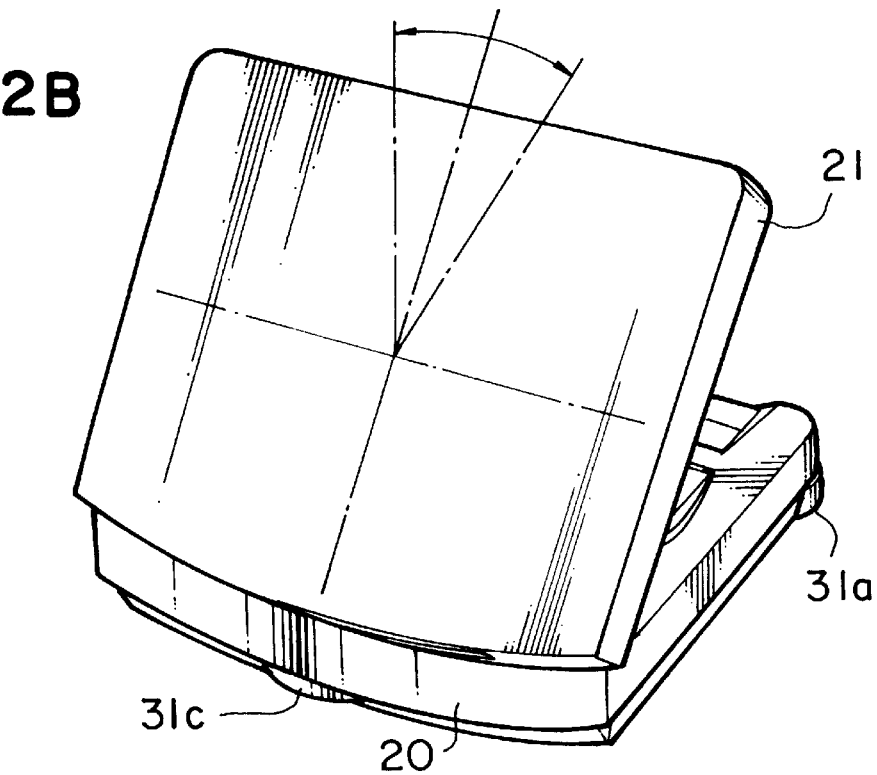
Figure 3:
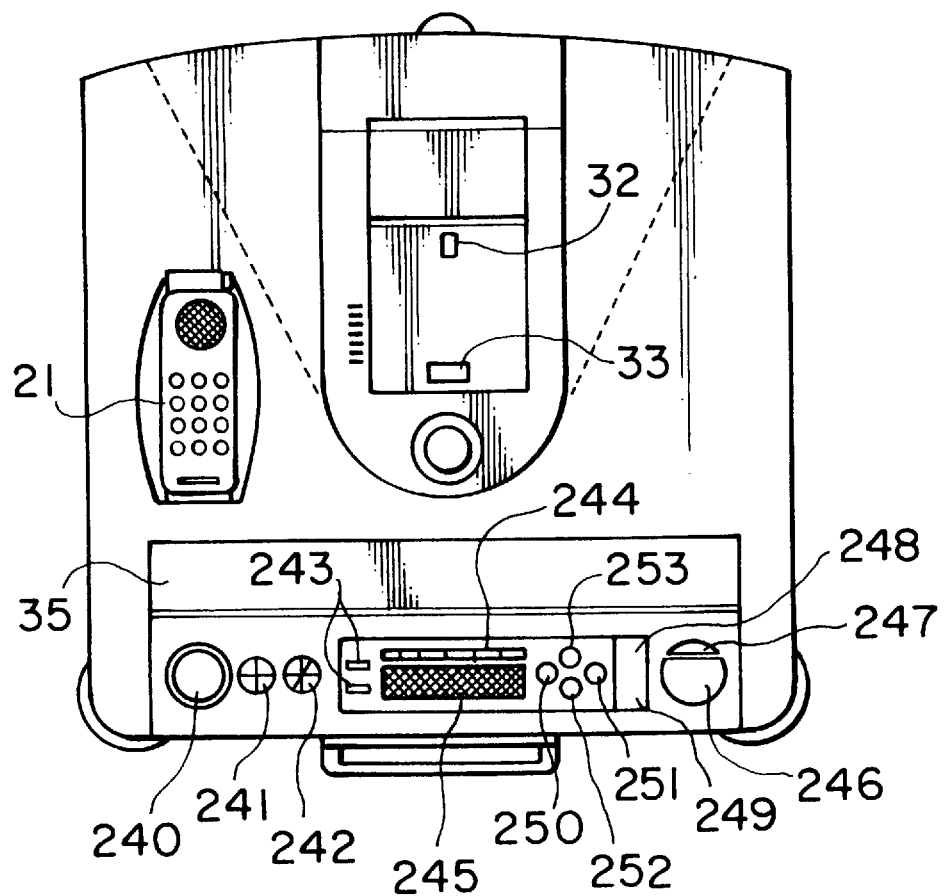
FIG. 3 is a plan view illustrating the configuration of arrangement on the upper surface of a body portion in FIG. 2.
Figure 5:
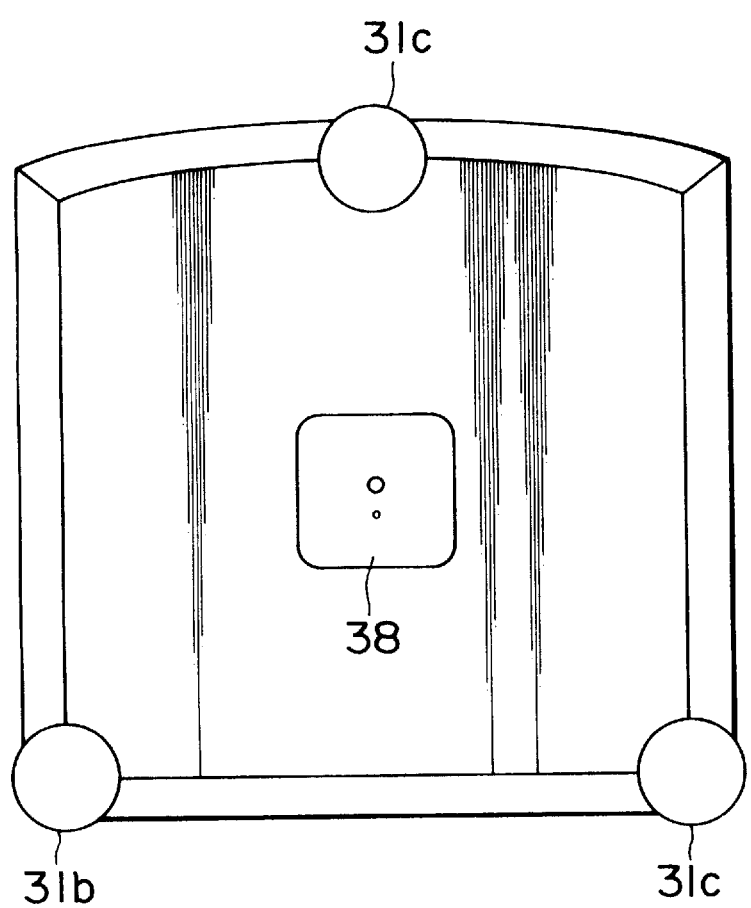
FIG. 5 is a bottom view of the portable satellite communication apparatus.
Figure 6A:
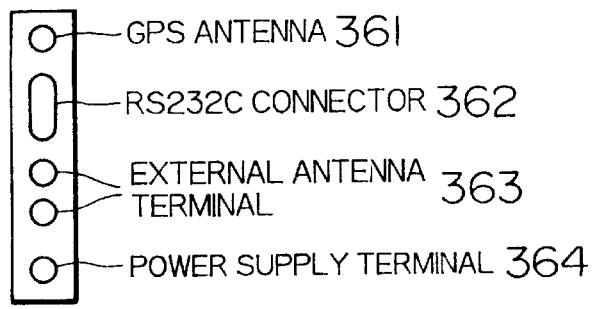
FIGS. 6A, 6B and 6C are a front view, a partial side view and a partial side view for explaining a connector portion of the portable satellite communication apparatus.
Figure 6B:
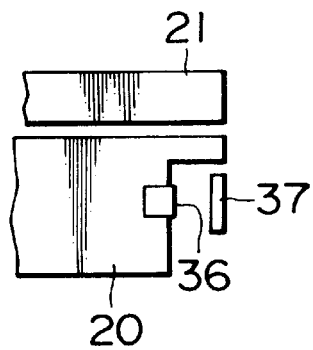
Figure 6C:
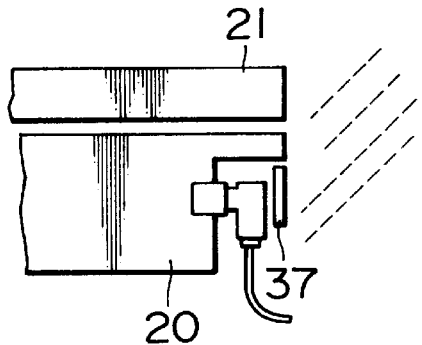
Figure 7:
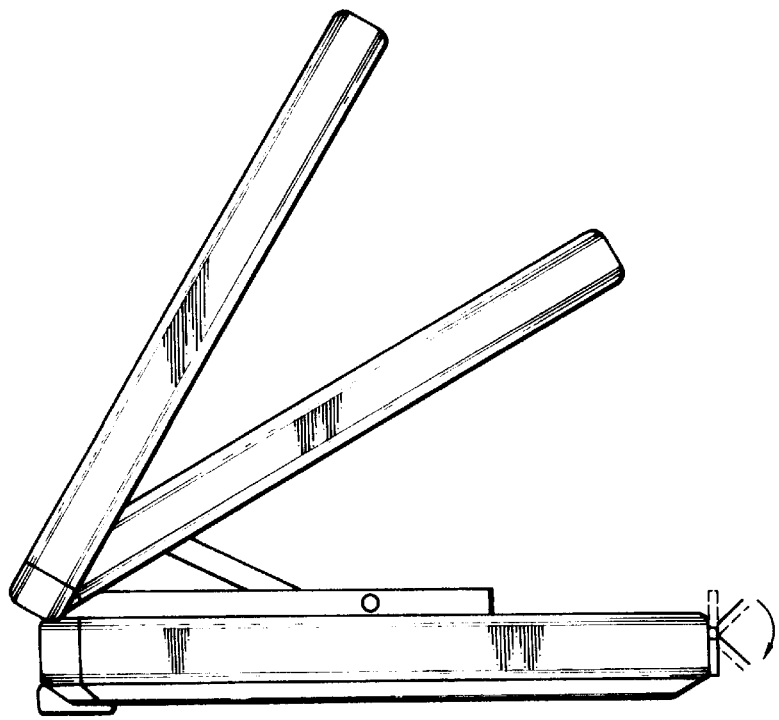
FIG. 7 is a side view for explaining the state where the antenna of the portable satellite communication apparatus is opened.
Figure 8A:
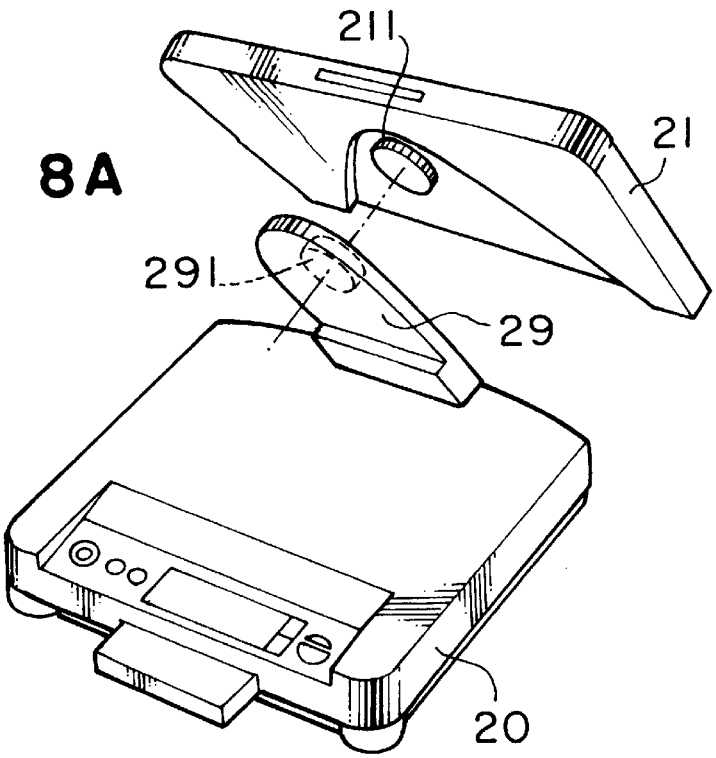
FIGS. 8A, 8B and 8C are a perspective view, a plan view and a perspective views for explaining a rotary mechanism of the antenna and the rotating state thereof.
Figure 8B:
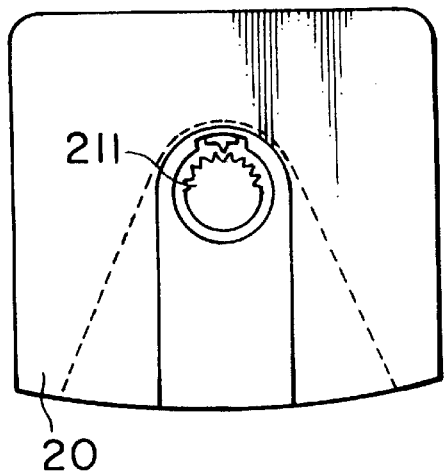
Figure 8C:
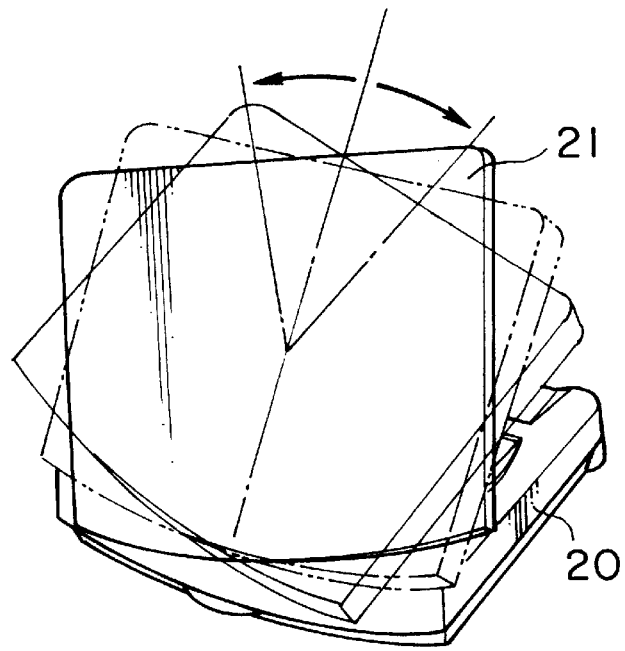
Figure 9:
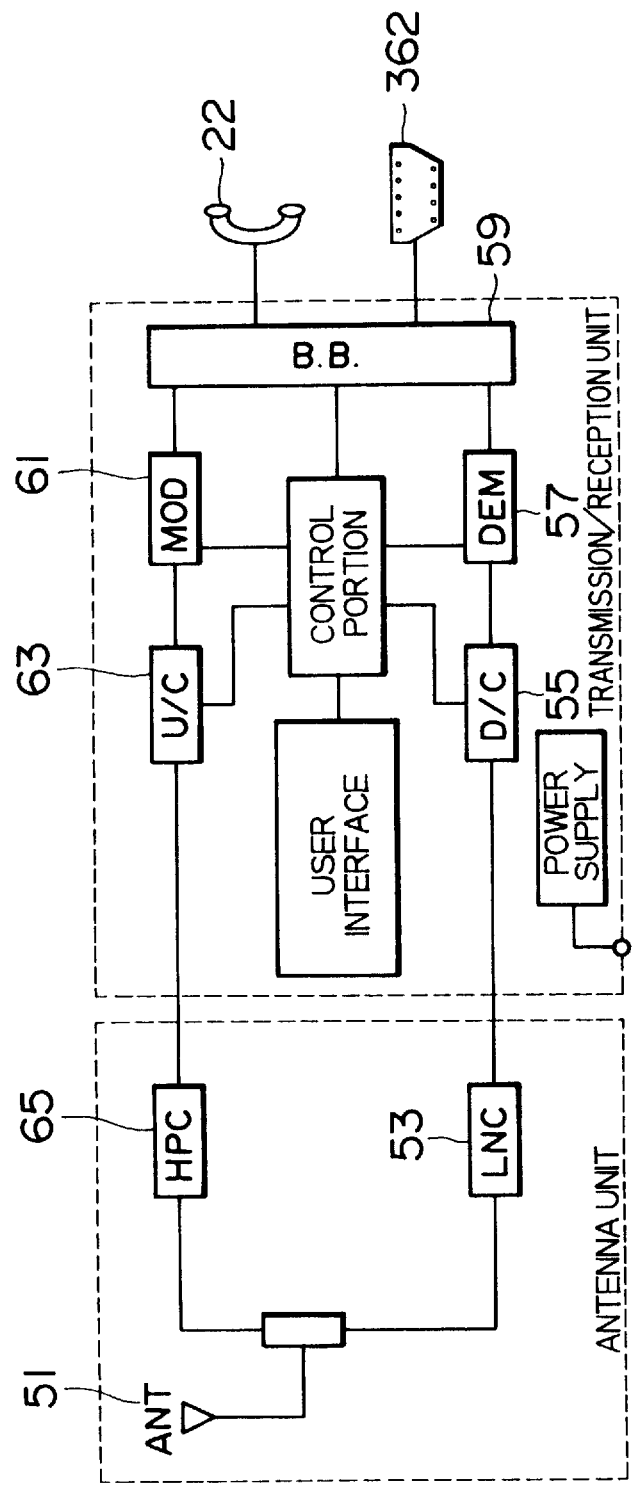
FIG. 9 is a block circuit diagram illustrating the circuit configuration of the portable satellite communication apparatus.

Next, the configuration of the embodiment of the portable satellite communication apparatus according to the present invention and used in the above-mentioned system example will be described. FIGS. 2A and 2B are perspective views, respectively, illustrating the external appearance of the portable satellite communication apparatus according to the embodiment of the present invention, FIG. 3 is a top view illustrating the appearance of the upper surface of a body portion in FIGS. 2A and 2B, FIGS. 4A, 4B, 4C and 4D are a front view, a sectional view illustrating the state where an antenna of the portable satellite communication apparatus is stored, and partial views for explaining the relationship between a carrying handle and a locking buckle, respectively, FIG. 5 is a bottom view of the portable satellite communication apparatus, FIGS. 6A, 6B and 6C are views for explaining a connector portion, FIG. 7 is a side view for explaining the state where the antenna is opened, FIGS. 8A, 8B and 8C are views for explaining a rotary mechanism of the antenna and the rotating state thereof, and FIG. 9 is a diagram for explaining a method of installing the portable satellite communication apparatus according to the embodiment of the present invention. In FIGS. 2A and 2B, FIG. 3 and FIGS. 4A–4D, the reference numeral 20 represents a body portion; 21, an antenna portion; 22, a transmitter/receiver (hereinafter referred to as "handset"); 23, a handset storing portion; 24, a panel portion; 25, a handle for hanging and carrying the portable satellite communication apparatus in hand; 26, a buckle; 27, an elevation angle adjustor; 28, an azimuth angle adjustor; 29, an antenna supporting portion; 30, a lamp; 31a to 31c, insulators; 32, a fine control finger grip; 33, a lock finger grip; 34, an azimuth angle adjustor supporting point; 35, a handling instruction indicating portion; 36, a connector portion; 37, a connector cover; 38, a tripod base; and 39, a transmitting/receiving circuit portion.

FIG. 2A shows the antenna portion 21 of the portable satellite communication apparatus 4 according to the embodiment of the present invention, in its opened state and viewed from its front side, and FIG. 2B shows the same one viewed from its back side. As shown in these drawings, the portable satellite communication apparatus 4 according to the embodiment of the present invention is constituted by the body portion 20 and the antenna portion 21. With this configuration, the embodiment of the present invention can make the apparatus small in size and simple in structure as a whole. Further, since the antenna portion 21 is configured as a cover of the body portion 20, various devices provided on the upper surface of the body portion 20 can be protected by this antenna portion 21.

The antenna portion 21 includes a not-shown micro-strip antenna provided inside the antenna portion 21 in a manner so that the upper surface side of the antenna is made to be in the direction of transmission and reception of radio waves. The antenna portion 21 is coupled with the azimuth angle adjustor 28 provided in the body portion 20, through the antenna supporting portion 29, from the back surface portion of the apparatus so as to be rotatable, that is, so as to be openable and closable. The antenna portion 21 has a function to act also as a cover of the body portion 20 of the apparatus. With this cover, it is possible to protect the body portion 20 and various devices provided on the upper surface of the body portion 20. The surface of the antenna portion 21 opposite to the body portion 20 is flat so that carrying of the communication apparatus according to the embodiment of the present invention is easy, and the communication apparatus is excellent in its safety.

Since this antenna portion 21 is coupled with the azimuth angle adjustor 28 through the antenna supporting portion 29 as mentioned above, the azimuth angle can be adjusted by rotating the azimuth angle adjustor 28 around the azimuth angle adjustor supporting point 34. The elevation angle adjustor 27 for adjusting the elevation angle of the antenna portion 21 is provided on the azimuth angle adjustor 28. One end portion of this elevation angle adjustor 27 is rotatably coupled with the antenna portion 21, while the other end portion of the same slides in a groove provided in the azimuth angle adjustor 28, and is locked in its slide position by means of the lock finger grip 33. Thus, the elevation angle of the antenna portion 21 is adjusted by sliding the other end portion of the elevation angle adjustor 27 in the groove. In addition, a fine control mechanism which can extend and contract the elevation angle adjustor 27 slightly is provided in the center portion of the elevation angle adjustor 27, and the elevation angle of the antenna portion 21 can be controlled finely by the fine control finger grip 32.

The elevation angle adjustor 27 can adjust the elevation angle roughly by sliding the elevation angle adjustor 27 in the groove while the fine control mechanism can adjust the elevation angle finely by extending and contracting the elevation angle adjustor 27 slightly through the fine control finger grip 32, so that the elevation angle can be adjusted rapidly and at a high accuracy. In addition, as will be described later, when the aimed values of the azimuth and elevation angles of the antenna are indicated in an LCD indicating portion so that the elevation angle is established on the basis of the input of this aimed value, the elevation angle is adjusted first by sliding the elevation angle adjustor 27 in the groove as mentioned above, and next adjusted into the best elevation angle value through the fine control finger grip 32 for adjusting the fine control mechanism with the received condition of radio waves being viewed. In such a manner, the adjustment can be performed more easily and rapidly.

The antenna portion 21 is supported by the antenna supporting portion 29 at a support point substantially at a center portion of the antenna portion 21 so that the antenna portion 21 is rotatable around this support point. The polarization angle of the antenna is adjusted by this rotation. The lamp 30 is provided in the antenna supporting portion 29 for lighting, at night or the like, the panel portion 24 and the handling instruction indicating portion 35 which are provided on the upper surface of the body portion 20 so as to make the handling of the apparatus easy. This lamp 30 is turned on by a not-shown switch, or turned on automatically when the antenna portion 21 is opened. The above-mentioned control of the direction of the antenna portion 21 will be described in detail later.

A body portion cover 42 is provided on the upper surface of the body portion 20 so that the inside of the body portion 20 is of a waterproof structure. A control circuit for transmission and reception and a control circuit for operation are provided in this inside. As shown in FIGS. 2A, 2B and FIG. 3, the handset storing portion 23 for storing the handset 22 used for talking, and the panel portion 24 are provided on the upper surface of the body portion cover 42, while the azimuth angle adjustor 28 of the antenna portion 21 is attached on the upper surface of the body portion cover 42. The carrying handle 25 and the buckle 26 which is a lock mechanism for locking the antenna portion 21 with the body portion 20 when the antenna portion 21 is closed are provided on the front surface of the body portion 20, while the connector portion 36 having terminals for connecting various external devices, which will be described later, is provided on the side surface.

The panel portion 24 is provided with a power supply switch 240, a level 241, an azimuth compass 242, an error indicating LED 243, a level indicating LED 244, an LCD indicating portion 245, a transmission switch 246, a transmission permission indicating LED 247, a voice transmission/reception switch 248, a data transmission/reception switch 249, a mode changeover switch 250, a set switch 251, and indication scroll switches 252 and 253. In addition, the handling instruction indicating portion 35 is provided adjacently to this panel portion 24, and pasted with a print where a simple manner of handling the apparatus or the relationship between a transmission/reception area and a direction of a satellite, that is, between the azimuth angle, the elevation angle and the polarization angle is described. Although indicating instructions by pasting such a print is the simplest method, it is difficult to give required instructions in good timing. It is therefore preferable to indicate the instructions with LCDs or the like. In this case, required ways of operation can be indicated sequentially in accordance with the operations of finger grips and the operations of the adjustor, so that the operations becomes easier and erroneous operation can be prevented. The above-mentioned panel portion 24 and handling instruction indicating portion 35 are provided on a surface which is formed so as to be inclined down toward this side relative to the upper surface of the body portion 20 to thereby improve the operating performance of the apparatus. The operation switches and so on provided on the above-mentioned panel portion 24 are arranged in the order from the left to the right correspondingly to the procedure of the operation, so that it is possible to facilitate understanding of the operation. In addition, the panel portion 24 is provided near the instruction indicating portion 35 for indicating an operating manner to thereby facilitate carrying out the operation.

The three insulator 31a to 31c are provided in the bottom surface of the body portion 20 at the opposite end portions on this side and at a center portion on the back surface, respectively, so as to be used for installing the apparatus horizontally by adjusting their heights. In addition, the tripod base 38 is provided at the center portion of the bottom surface of the body portion 20 as shown in FIG. 5 so that the portable satellite communication apparatus 4 can be used on a tripod.

Figure 4A:
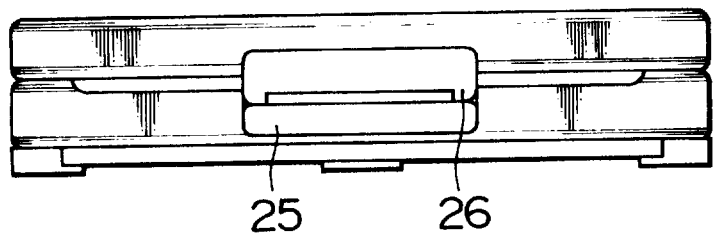
FIGS. 4A and 4B are a front view and a sectional view illustrating the state where an antenna of the portable satellite communication apparatus is stored.
Figure 4B:
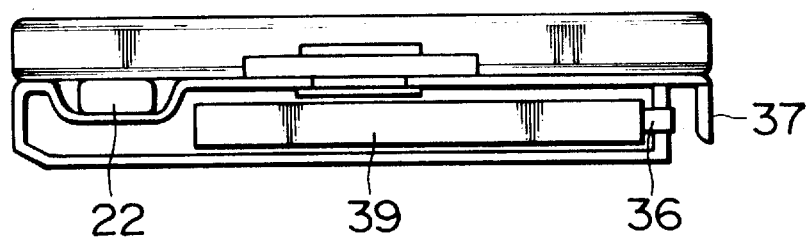

FIGS. 4A and 4B are front and sectional views of the antenna portion 21 in the state where the antenna portion 21 is closed. As seen in the drawings, the portable satellite communication apparatus 4 can be carried by the carrying handle 25 since the body portion 20 and the antenna portion 21 are combined by the buckle 26 when the antenna 21 is closed. In addition, the apparatus body portion 20 stores therein the transmission/reception circuit portion 39 which makes communication with a communications satellite and includes a controller for controlling the communication and also controlling the apparatus as a whole. The controller monitors the input signal level supplied from the antenna portion 21 into the transmission/reception circuit portion 39 and the level of a power supply voltage, and when any level decreases, the controller can indicate this situation on the error indicating LED 243 to thereby give an alarm.

Figure 4C:
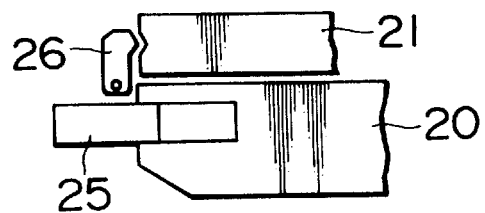
FIGS. 4C and 4D are partial side views for explaining the relationship between a carrying handle and a locking buckle.
Figure 4D:
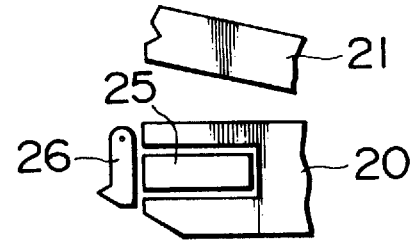

FIGS. 4C and 4D show the relationship between the carrying handle 25 and the locking buckle 26. As shown in FIG. 4C, the handle 25 is pulled out from the body portion 20 when the apparatus is carried, and then the buckle 26 is inhibited from rotating by the handle 25 at that time, so that the lock state where the body portion 20 and the antenna portion 21 are closed cannot be released. As shown in FIG. 4D, when the handle 25 is pushed into the body portion 20, the buckle 26 can release the lock. On the contrary, the handle 25 cannot be pulled out unless the body portion 20 and the antenna portion 21 are closed and brought into the lock state by the buckle 26. Consequently, the apparatus cannot be carried in error in a condition that the antenna portion 21 is opened. Further, the antenna portion 21 can be prevented from being opened on the way of the carriage.

The buckle 26 is provided on the body portion 20 side. This is because it is necessary to establish the above-mentioned relationship between the buckle 26 and the handle 25, and it is also necessary to avoid such a disadvantage that if the buckle 26 is provided on the antenna portion 21 side, the buckle 26 may hang from the antenna portion 21 to disturb operation, adjustment, and eye-viewing of the indicating portion in the panel portion on the upper surface of the body portion 20 when the antenna portion 21 is opened.

Further, though not-shown, a battery which is a power supply for the operation is stored in the body portion 20. In addition, the transmission/reception circuit portion 39 is connected to the connector portion 36 which includes various connectors and which is disposed on the inside of the connector cover 37 provided on the side of the body portion 20. In addition, though not shown, an electric torch and so on may be stored in the body portion 20 so that it can be taken out promptly.

As shown in FIG. 6A, the various connectors provided in the connector portion 36 include: a connector 361 for connection with a GPS device for inputting position information if necessary; an RS232C connector 362 as an interface with a personal computer or the like; a connector 363 for connection with an external antenna; a power supply connector 364 for supplying electric power from an external battery, a battery of a car, a motorbike, etc., or a commercial power supply or the like; and so on.

In addition, as shown in FIG. 6B, the connector cover 37 for covering the connector portion 36 is attached to the body portion 20 through a spring or the like so as to be outward rotatable relative to the body portion 20 from its side to the outside, and the lower portion of a space between the connector portion 36 and the connector cover 37 is left opened without providing any bottom plate or the like. Consequently, as shown in FIG. 6C, a connection terminal of an external apparatus with its connection cord downward can be connected to the connector portion 36. When the connection terminal of an external apparatus is to be connected to the connector portion 36, suffices it to rotate the connector cover 37 outward against the rotating force of the spring or the like so as to connect the connection terminal, and upon completion of the connection, the connection terminal can be covered with the connector cover 37 automatically. Consequently, when the apparatus is used outdoors or so, it is possible to prevent rain, sand, etc. from entering the connector portion 36 from the upper or side surface portion of the body portion 20.

Next, the setting of the direction of the antenna portion 21 will be described with reference to FIGS. 7, 8A, 8B and 8C. The elevation angle of the antenna portion 21 generally depends on the latitude and longitude of the place where the satellite communication apparatus 4 is used, and the longitude which is a position on the equator of a communications satellite to be used, and the elevation angle is in a range of from 30 degrees to 60 degrees in Japan. The direction of the antenna provided inside the antenna portion 21 is perpendicular to the upper surface of the antenna portion 21, and hence it is the direction of the arrow shown in FIG. 7. The antenna portion 21 may be designed so as to be opened automatically up from the body portion 20 to about 60 degrees which is the largest angle by means of a spring or the like engaging with the body portion 20 and the antenna portion 21, when the buckle 26 is released. In practical use, the elevation angle may be adjusted while the antenna portion 21 is pulled to this side from that position. Although the azimuth angle of the antenna portion 21 also depends on the latitude and longitude of the place where the satellite communication apparatus 4 is used, and the longitude which is a position on the equator of a communications satellite to be used, particularly the latitude of the used place and the longitude of the communication satellite, this azimuth may be directed to the direction when the satellite communication apparatus 4 itself is set, and the adjusted angle of the antenna portion 21 relative to the body portion 20 for adjusting the azimuth angle after this setting is slight. Next, a rotating mechanism of the antenna and the adjustment of the polarization angle by the rotation of the antenna using this mechanism will be described with reference to FIGS. 8A, 8B and 8C.

Since radio waves from a communications satellite used herein are, generally, straight polarized waves, it is necessary to make the polarization angle of the antenna portion 21 coincide with the direction of the straight polarization of the radio waves from the communication satellite. Therefore, after the elevation and azimuth angles are adjusted as mentioned above, the antenna portion 21 is rotated to adjust the polarization angle without changing these angles. This adjustment of the polarization angle is performed while radio waves from the communications satellite are being received, as will be described in detail later together with the method of adjusting the elevation and azimuth angles. The antenna portion 21 is combined with the inside of a combining hole in which a spring 291 of the antenna supporting portion 29 is provided by a gear 211 provided in the antenna portion 21, and supported by the antenna supporting portion 29 as shown in the exploded perspective view of FIG. 8A mainly illustrating the antenna supporting portion 29 and the antenna portion 21. The spring 291 and the gear 211 engage with each other so that the mountain portions of the spring portion 291 engage with the valley portions of the gear 211 as shown in the top view of FIG. 8B. Consequently, the antenna portion 21 is supported by the antenna supporting portion 29 so as to be rotatable pitch by pitch of the gear 211. Accordingly, the antenna portion 21 can be rotated around the gear provided at the antenna center portion as shown in FIG. 8C.

A block diagram of an electric circuit for transmission and reception is shown in FIG. 9. This block diagram shows an extremely general and well-known circuit as an electric circuit for satellite communication. Straight polarized radio waves from a communications satellite are received by an antenna 51, sent to a down converter 55 through a low noise converter 53, converted from a high frequency to an intermediate frequency in the down converter 55, and demodulated in a demodulator 57 so that signals of voice, data, and so on, are extracted and sent to the handset 22 or the data port (RS232C connector) 362 through a base band 59 which acts as an interface. The voice or data from the data port 362 or the handset 22 is sent in the form of a signal to a modulator 61. This signal is modulated in this modulator 61, sent to an up converter 63 with a carrier wave of an intermediate frequency so as to be converted therein into a high frequency, amplified in a high power converter 65, and then transmitted from the antenna 51.

Figure 10A:
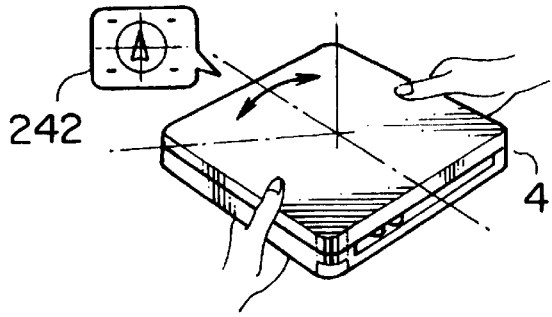
FIGS. 10A, 10B, 10C, 10D and 10E are perspective and side views for explaining the installing method of the portable satellite communication apparatus.

Next, the method of the setting of the apparatus, the adjustment of the direction of the antenna portion 21, and the communication by the satellite communication apparatus 4 when the satellite communication apparatus 4 according to the embodiment of the present invention is used will be described with reference to FIGS. 10A to 10E. First, the satellite communication apparatus 4 is installed in a comparatively flat place where the apparatus can be put stably, such as the ground, a floor, a table or the like, so that the back surface portion of the apparatus is in the azimuth of a communication satellite. In this occasion, this setting of the azimuth is performed by use of the azimuth compass 242 so that the azimuth takes a direction depending on the apparatus installation place. For this, a table showing the relationship between a place where the apparatus is installed, and the azimuth and elevation angles is pasted onto the body of the apparatus in advance. In addition, the table may be stored in the apparatus to be read out and indicated as will be described later. The setting of the azimuth need not be very correct (FIG. 10A).

Figure 10B:
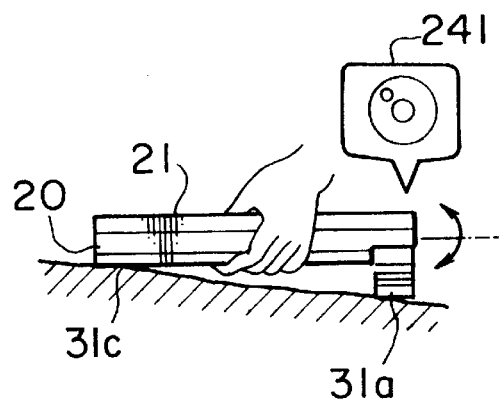

Next, the heights of the three insulators 31a to 31c provided on the bottom of the body portion 20 of the apparatus are adjusted while viewing the level 241, so that the body portion 20 is set substantially horizontally (FIG. 10B). Although the above-mentioned azimuth matching of the apparatus and setting the apparatus horizontally are performed with the antenna portion 21 closed in the above description, they may be performed with the antenna portion 21 opened. In the case where this operation is performed with the antenna portion 21 closed, the azimuth compass 242 and the level 241 may be provided not on the upper surface of the body portion 20 but on the upper surface of the antenna portion 21 so that they can be seen easily.

Next, if the antenna portion 21 is in the closed state, the buckle 26 is released to open the antenna portion 21, and the elevation angle of the antenna portion 21 is adjusted roughly into a value in accordance with the location. The adjustment of the elevation angle in this occasion is performed by moving the elevation angle adjustor 27 in a groove provided in the azimuth angle adjustor 28 while viewing an elevation angle scale 271 provide in the azimuth angle adjustor 28 (FIG. 10C), as described in FIGS. 2A and 2B. Next, the power is turned on. Although the power may be turned on at any point of time in the process of operation till then, it is preferable to supply electricity to the whole of the transmission/reception circuit at this point of time when the exhaustion of a built-in battery is taken into consideration. At this time, the antenna portion 21 has already faced substantially toward the communication satellite. Accordingly, upon the power turning-on, the transmission/reception circuit portion 39 in the body portion 20 receives radio waves transmitted through the communications satellite 3 from the center station 1 or the sub-center station 2, and indicates the received signal level in the form of a bar on the level indicating LED 244.

A worker finely adjusts the azimuth angle of the antenna portion 21 to maximize the level of received signals, while viewing the level of the received signals through the indication of the level indicating LED 244. The elevation angle of the antenna portion 21 is finely adjusted by means of the fine control finger grip 32 provided in the elevation angle adjustor 27 so as to maximize the level of the received signals. After these azimuth and elevation angles are finely adjusted several times repeatedly in accordance with necessity, the finely adjusted azimuth and elevation angles of the antenna portion 21 are fixed by the lock finger grip 33 (FIG. 10D).

Figure 10C:
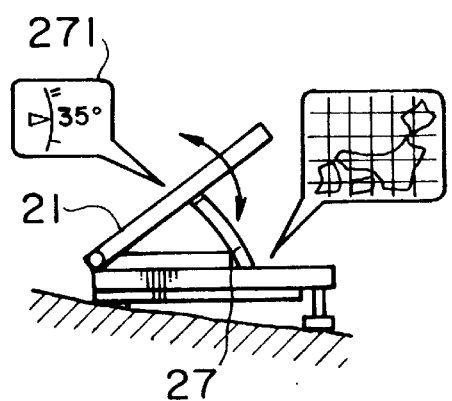
Figure 10D:
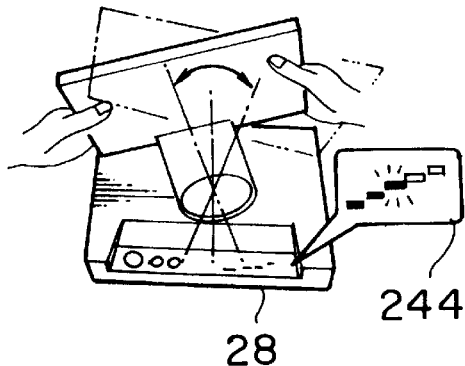
Figure 10E:
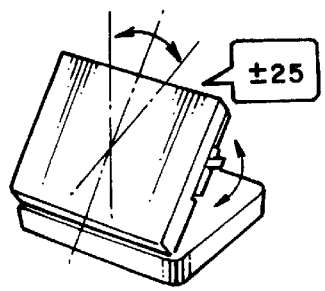

Next, the worker rotates the antenna portion 21 while viewing the level of the received signals through the indication of the level indicating LED 244 in the same manner as mentioned above so as to adjust the polarization angle of the antenna portion 21 (FIG. 10E).

If the above-mentioned setting of the satellite communication apparatus 4 is completed, the worker takes out the handset 22 from the body portion 20 so that the worker can communicate with the center station or the like. The setting of a communication line between the handset 22 and the center station 1 or the like may be performed in accordance with a well-known communication protocol by use of an operation button provided on the panel portion 24, a ten-key provided on the handset 22, or the like. The connection between the handset 22 and the transmission/reception circuit in the body portion 20 may be performed while including the power from the battery provided in the body portion 20 through a metal line, or may be performed cordlessly with a battery charger or a dry battery compatible power supply provided in the handset 22.

Although the above-mentioned communication using the handset 22 is performed by voice, the satellite communication apparatus according to the embodiment of the present invention can transmit and receive data and picture information if a personal computer or the like is connected to the apparatus through the connector portion 36 provided on the body portion 20.

Next, means for obtaining information necessary for setting the azimuth and elevation angles of the antenna portion 21 which was described with reference to FIGS. 10A–10E will be described. As described above, the azimuth and elevation angles of the antenna portion 21 depend on the position of the communications satellite to be used, and the place where the satellite communication apparatus is used. Since the communications satellite to be used is determined in advance, the azimuth and elevation angles are determined substantially depending on the place where the satellite communication apparatus is used.

Therefore, in the simplest manner, for example, a table listing the correspondence between municipality names as use places and azimuth and elevation angles of the antenna portion 21 in the municipalities is pasted on the handling instruction indicating portion 35 provided on the upper surface of the body portion 20, or on the upper surface of the antenna portion 21 in advance, so that a user may refer to the table to know the azimuth and elevation angles in a municipality of the place where the satellite communication apparatus 4 is used, or in a municipality nearest to that place to thereby set the azimuth and elevation angles of the antenna 21 in such a manner as described with reference to FIGS. 10A and 10C.

The embodiment of the present invention can be configured in such a manner that a table showing the correspondence between use places and azimuth and elevation angles of the antenna portion 21 similarly to the above-mentioned table is provided in a ROM provided in a transmission/reception portion 39 the body portio of the apparatus or in a controller such as a microcomputer or the like for controlling the transmission/reception portion 39 so that this table can be referred to.

This table is, for example, constituted by prefecture names, municipality names, area names in the municipalities, and azimuth and elevation angle values corresponding to the area names. When searching is instructed to search the table, the controller first indicates prefecture names as a menu on the LCD indicating portion 245 provided in the panel portion 35. The worker searches the prefecture names indicated on the LCD indicating portion 245 by use of the indication scroll switches 252 and 253, and designates one of the prefecture names where the satellite communication apparatus is used. By this designation, next, municipality names in the designated prefecture are indicated as a menu on the LCD indication portion 245, and if one of the municipality names is designated in the same manner, next, area names in the municipality are indicated as a menu. If one of the area names is designated, the azimuth and elevation angles for the direction of the antenna portion 21 are indicated correspondingly to the designated area name.

Although the azimuth and elevation angles of the antenna portion 21 corresponding to the designated area name in the designated municipality are indicated in the above description, suffices it to indicate the azimuth ad elevation angles of the antenna portion 21 correspondingly to the designated municipality name, because these angles are finely adjusted by the worker while viewing the strength of received radio waves from the communications satellite as described with reference to FIGS. 10A–10E. Accordingly, it is possible to reduce the storage capacity of a ROM or the like for storing the table.

In addition, although the above-mentioned description is made on the assumption that the table of azimuth and elevation angles of the antenna portion 21 corresponding to municipality names and area names is used, a table of azimuth and elevation angles corresponding to area codes, zip codes or the like may be prepared in place of municipality names and area names, according to the present invention. Since these codes are inputted by numerals in this case, it is possible to immediately know the azimuth and elevation angles of the antenna portion 21. For the input of the numerals, the ten-key provided on the handset 22 may be used, or a ten-key may be provided on the panel portion on the body portion 20 so as to be able to use this ten-key.

Further, in the satellite communication apparatus according to the embodiment of the present invention, a GPS device may be connected to the GPS-device connection connector 361 of the connector portion 36, and position information (latitude and longitude information) of the place is inputted from the GPS-device so that the azimuth and elevation angles of the antenna portion 21 can be indicated on the LCD indicating portion 245 on the basis of this position information. Also in this case, a table in which the position information corresponds to azimuth and elevation angles may be provided, or azimuth and elevation angles may be calculated on the basis of the position information by means of a controller such as a microprocessor or the like provided inside.

Since the azimuth and elevation angles of an antenna portion corresponding to a use place can be easily known in the embodiment of the present invention as mentioned above, it is possible to set the antenna portion to direct toward a communications satellite rapidly and surely, and it is possible to start the running of the apparatus rapidly. In addition, according to the present invention, the azimuth and elevation angles of the antenna portion corresponding to the use place obtained in such an aforementioned manner can be stored so that they can be obtained immediately in the next use. In such a manner, in the case of use in the same place again after the use is finished once, it is possible to omit the operation to know the azimuth and elevation angles of the antenna to be set, and it is possible to start the use again more rapidly.

Figure 11A:
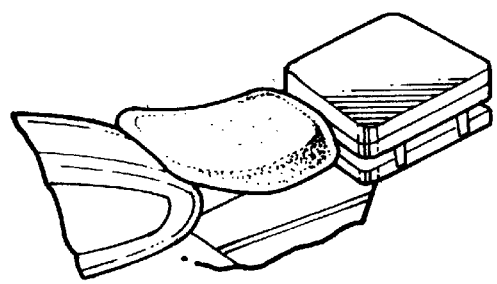
FIGS. 11A and 11B are a perspective view and a side view illustrating an embodiment in which the portable satellite communication apparatus is used in a condition where it is mounted on a motorbike.
Figure 11B:
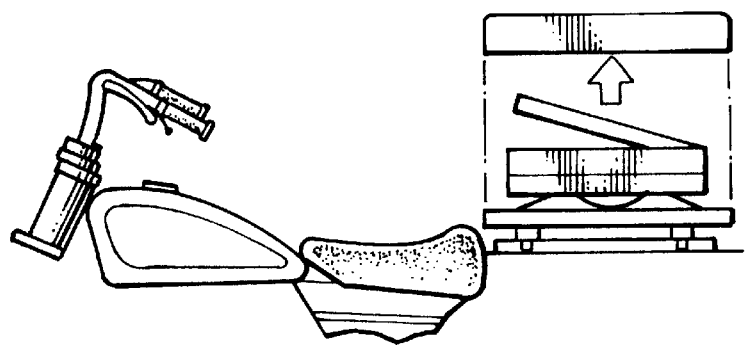

Although the portable satellite communication apparatus according to the embodiment of the present invention is used in installation on the comparatively flat ground, table or the like in the above description, the portable satellite communication apparatus is often used in the area in case of occurrence of an emergency disaster. In such a case, it is considered a motorbike is used as carrying means so that the portable satellite communication apparatus is carried on the carrier of the motorbike. In this a case, it is preferable that the portable satellite communication apparatus can be used as it is on the carrier of the motorbike. FIGS. 11A and 11B are diagrams for explaining a method of using the portable satellite communication apparatus on a carrier of a motorbike as it is in such a case, and the method will be described below.

The portable satellite communication apparatus 4 according to the embodiment of the present invention is stored in a casing fixed to a carrier of a motorbike, and fixed to a tilt swivel stand like that for an OA monitor or the like and provided on the bottom of the casing, at the time of carriage as shown in FIG. 11A. In use, the motorbike is stopped at a place where its posture can be kept stable, and the cover of the casing is opened. In this state, the portable satellite communication apparatus 4 is installed horizontally and in a predetermined direction by the tilt swivel stand as shown in FIG. 11B.

In a case where there is no flat ground or the like so that the installation as mentioned above cannot be performed even though the portable satellite communication apparatus 4 is carried to the area, the portable satellite communication apparatus 4 can be used while being fixed onto a portable stand, a tripod or the like as a method to be applied to wider installation conditions. Therefore, the portable satellite communication apparatus 4 has a tripod base 38 on the bottom of the body portion 20 as described above with reference to FIG. 5, so that the portable satellite communication apparatus 4 can be installed and used horizontally and in a predetermined direction on a not-shown tripod.

Figure 12:
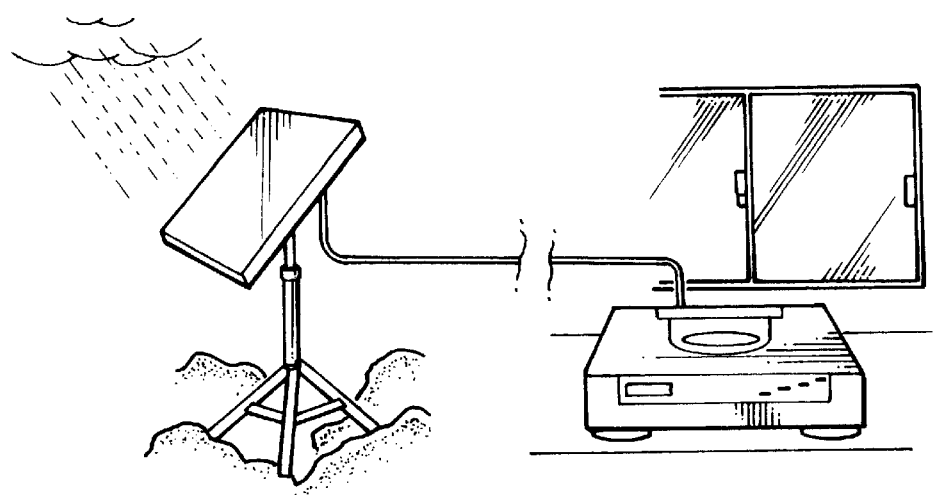
FIG. 12 is a perspective view illustrating another embodiment of the present invention using an external antenna connected thereto.

FIG. 12 is a diagram for explaining the mode of use in which an external antenna is connected to the apparatus in the embodiment of the present invention, which will be described below. This is a preferred method in the case where a portable satellite communication apparatus according to the embodiment of the present invention is used for a purpose other than an emergency disaster, or in the case where there is an available building even in case of in an emergency disaster. That is, as shown in FIG. 12, an antenna to be connected is installed externally outdoors by use of a stand or the like, while a portable satellite communication apparatus is installed and used indoors to thereby be kept free from wind, rain, and heat of sunshine.

In this case, the antenna can be installed on the basis of indicated information of azimuth and elevation angles indicated on the body portion, and received signal level indicated on the level indicating LED 244 of the body portion, in the same manner as in the above-mentioned case. In addition, if a commercial power source led into the building can be used, a required power source can be obtained by use of an adaptor or the like, so that power can be supplied through the external power supply terminal 364. According to such a method of use, a large-sized and large-gain antenna can be used as the external antenna to make it possible to use the apparatus stably without receiving any influence from weather conditions. It is possible to use the apparatus for a long time if a commercial power source can be used.

FIGS. 13A and 13B and FIGS. 14A and 14B are perspective views for explaining the appearance of a portable satellite communication apparatus according to other embodiments of the present invention, which will be described below.

Figure 13A:
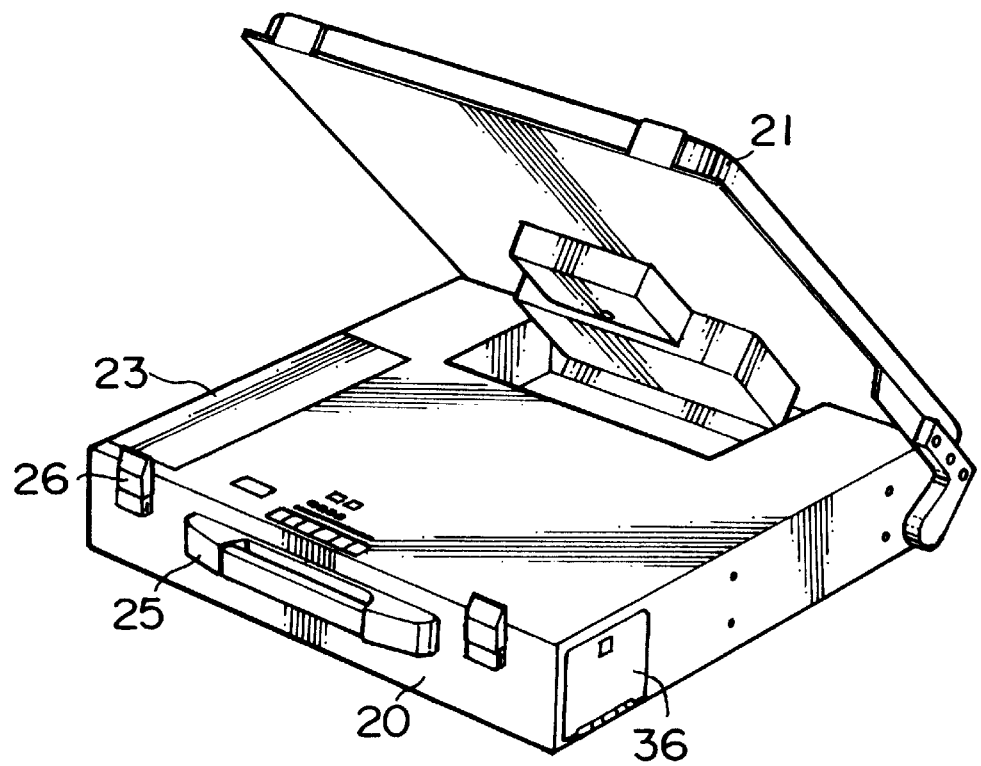
FIGS. 13A and 13B are perspective views, respectively, illustrating the external appearance of the portable satellite communication apparatus according to another embodiment of the present invention.
Figure 13B:
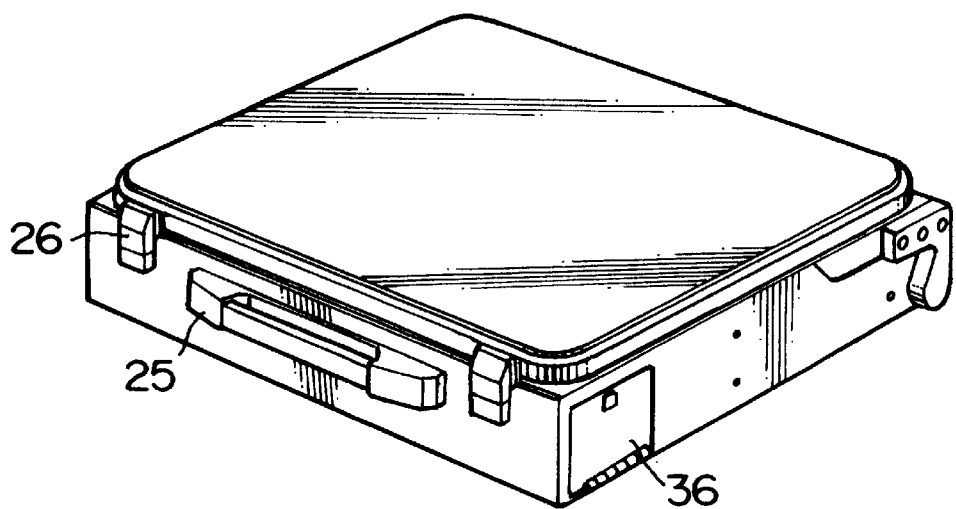

FIGS. 13A and 13B are a perspective view illustrating the state where an antenna portion is opened in another embodiment of the present invention, and a perspective view illustrating the state where an antenna portion is closed, respectively. The basic structure, arrangement and function of these embodiments are the same as that in the previous embodiment described above with reference to FIG. 1 through FIG. 12, except that the appearance and the arrangement of an indication portion or the like on the panel are different. In these embodiments, the azimuth angle of the antenna portion 21 is adjusted together with the body in order to simplify the mechanism and reduce the cost, and the azimuth angle adjustor 28 for adjusting the azimuth angle of the antenna portion 21 on the body portion 20 in the embodiment of the present invention which has been described is omitted.

Figure 14A:
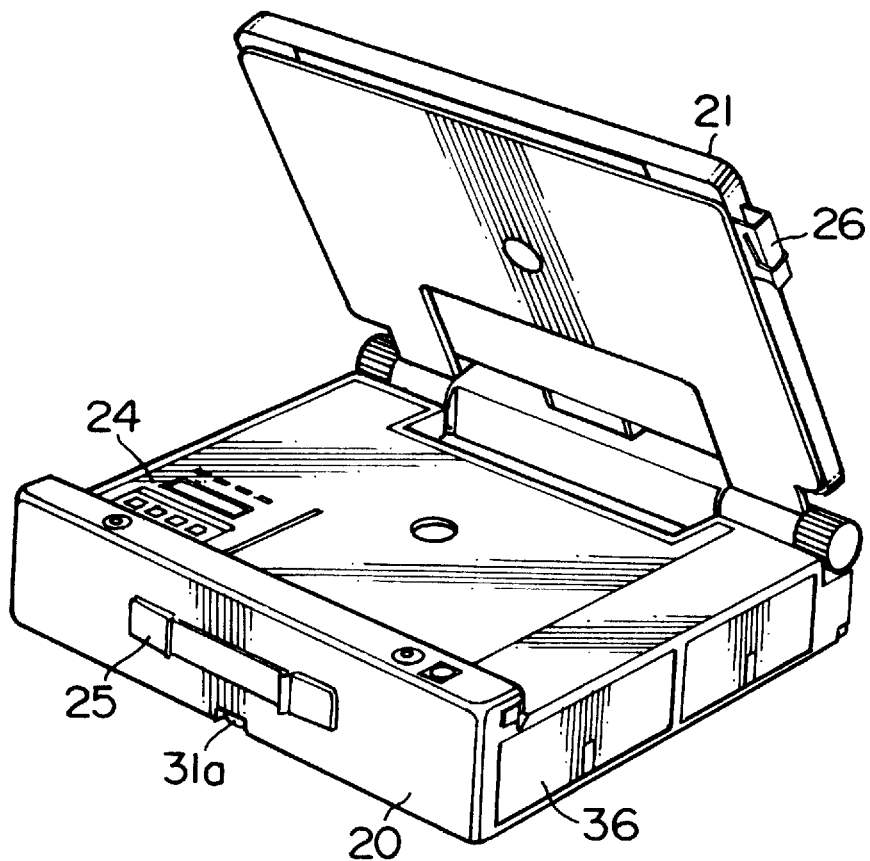
FIGS. 14A and 14B are perspective views, respectively, illustrating the external appearance of the portable satellite communication apparatus according to a further embodiment of the present invention.
Figure 14B:
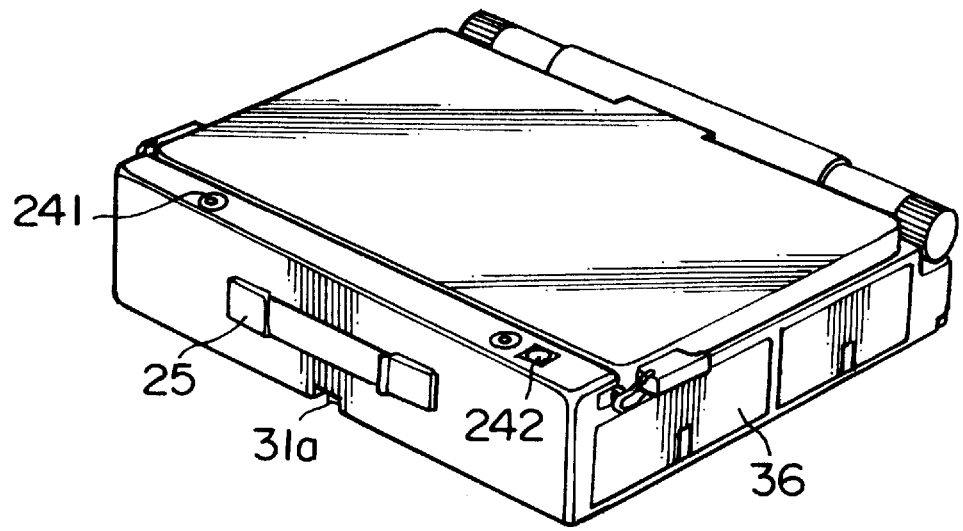

In the embodiment shown in FIGS. 14A and 14B, an upper surface portion of the front side of a body portion 20 is formed to be even in plane with an antenna portion 21 when the antenna portion 21 is closed, and a level 241 and an azimuth compass 242 are provided on this upper surface portion. In such a case of the embodiment shown in FIGS. 14A and 14B, the adjustment of the azimuth angle and the horizontal installation of the body portion 20 can be performed easily in the closed state of the antenna portion 21, in the same manner as described with reference to FIGS. 10A and 10B.

Figure 15A:
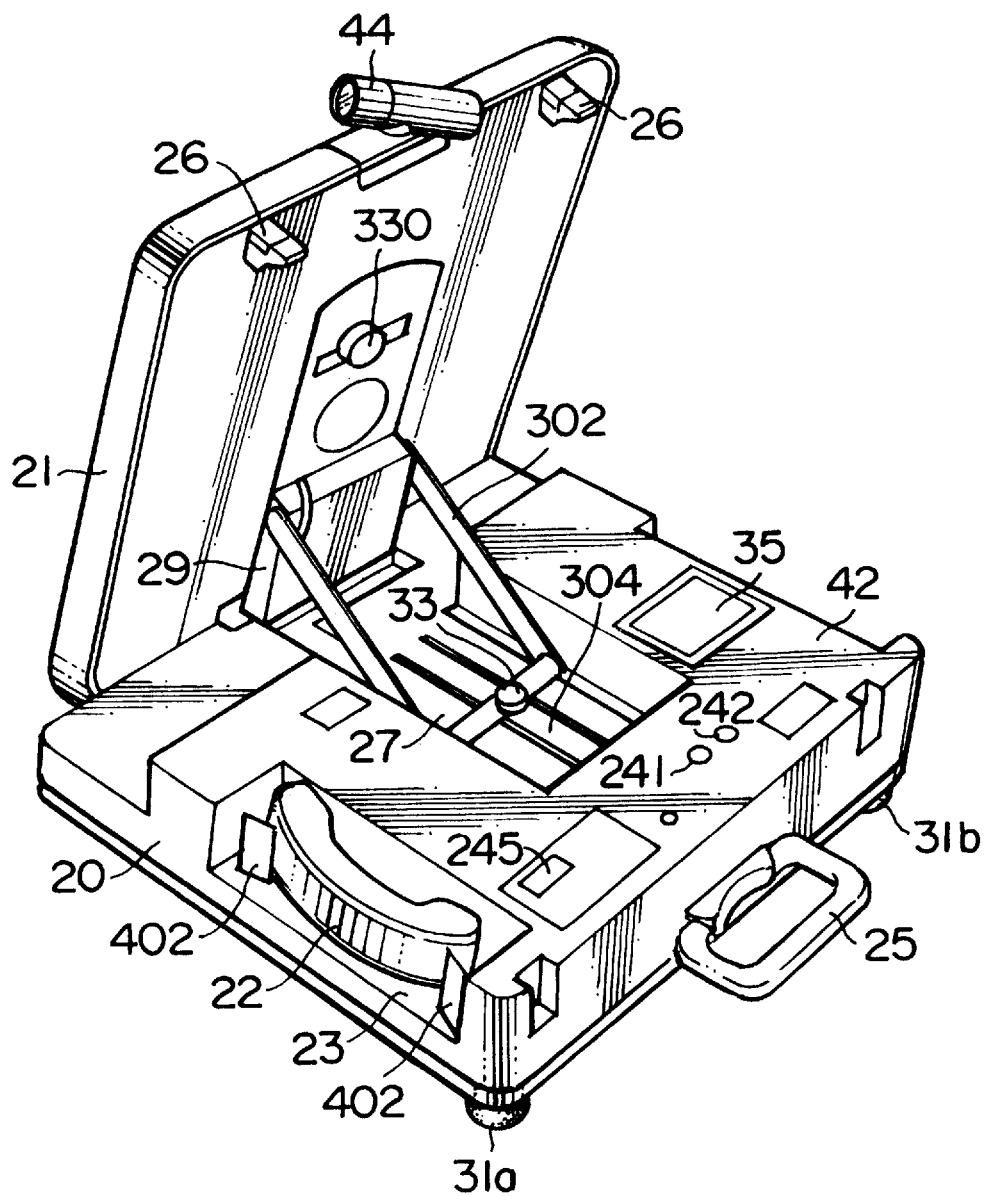
FIGS. 15A, 15B, 15C and 15D are a perspective view of the whole, a side view of the whole, a top view of the body portion, and top view of the antenna portion for explanation of the external appearance of the portable satellite communication apparatus according to a further embodiment of the present invention.
Figure 15B:
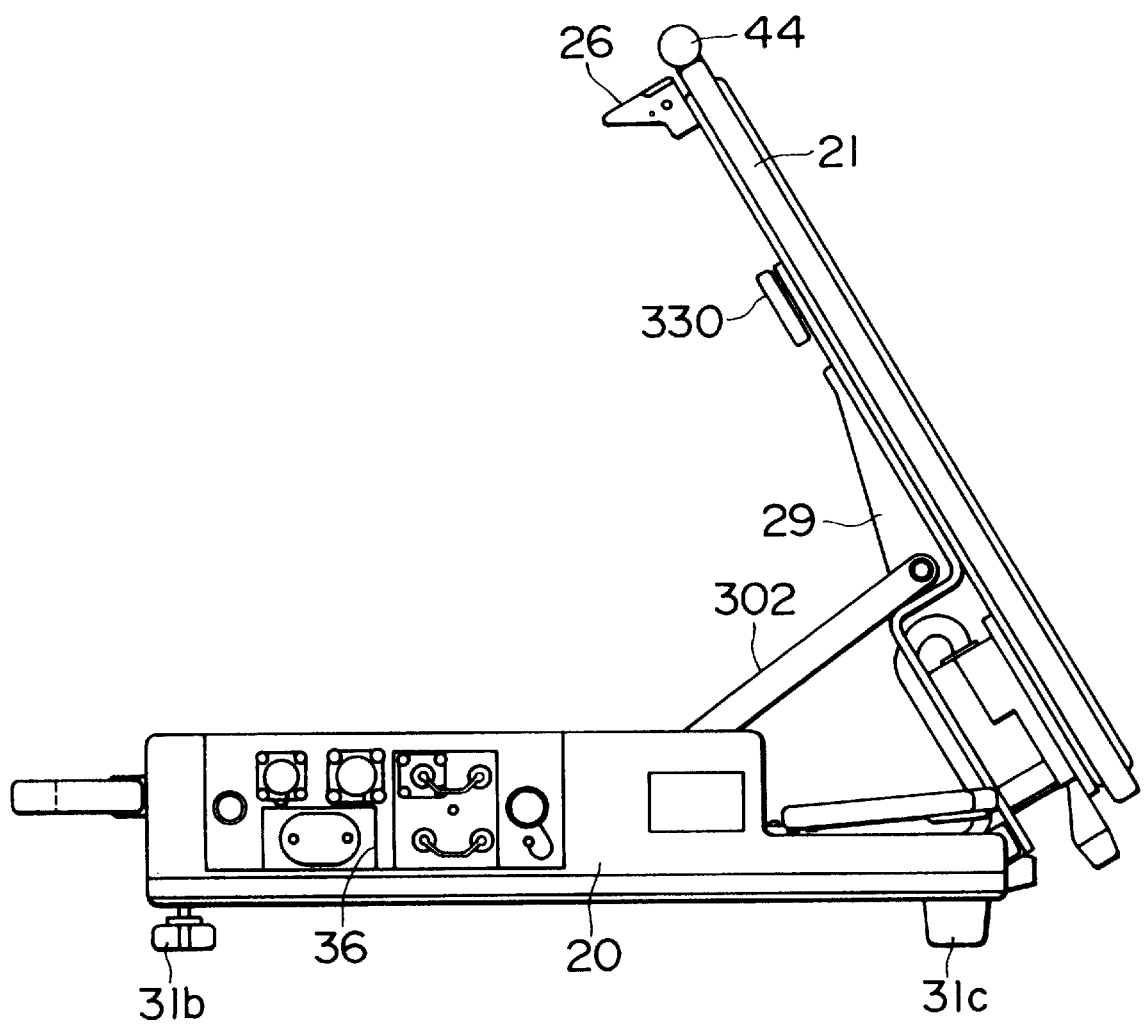
Figure 15C:
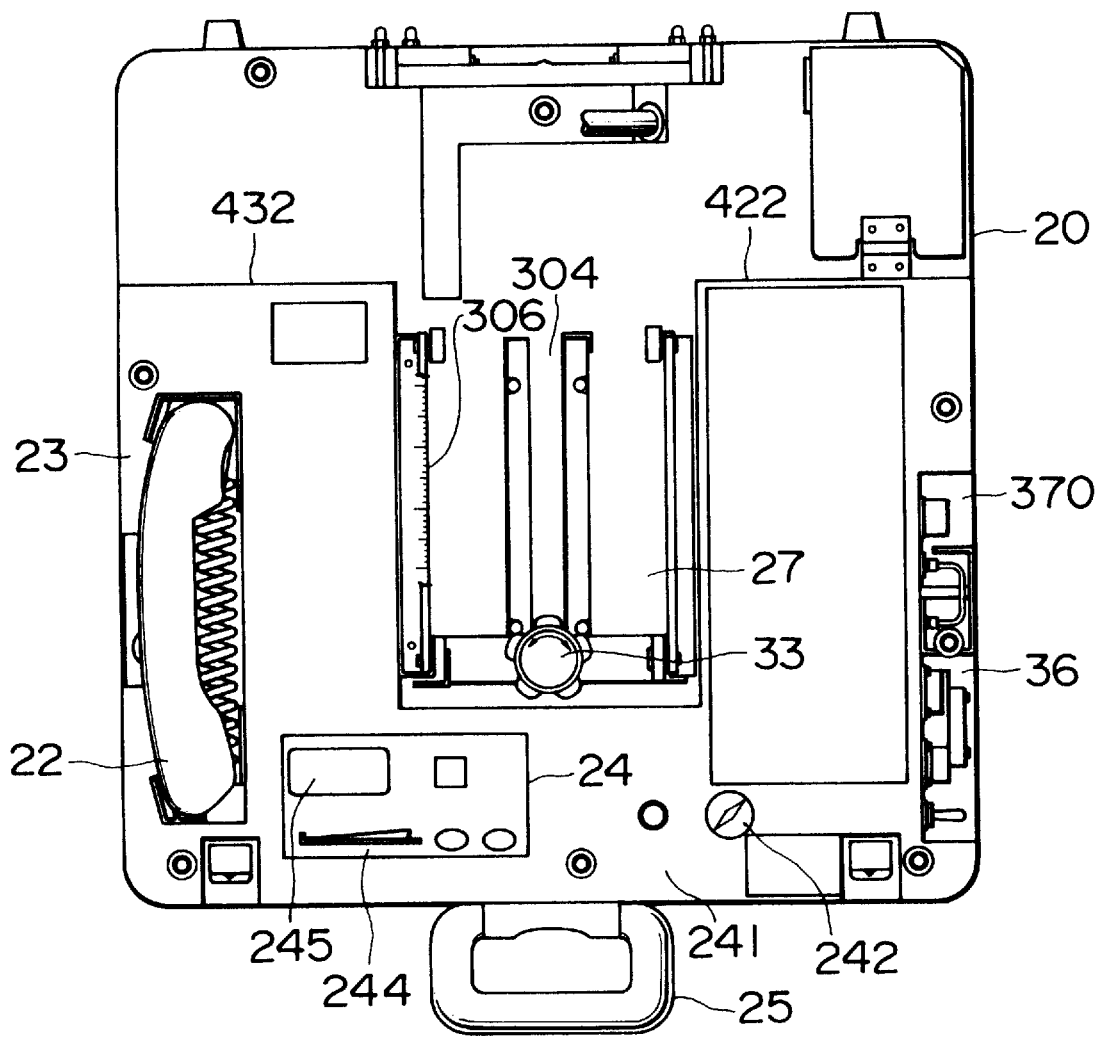
Figure 15D:
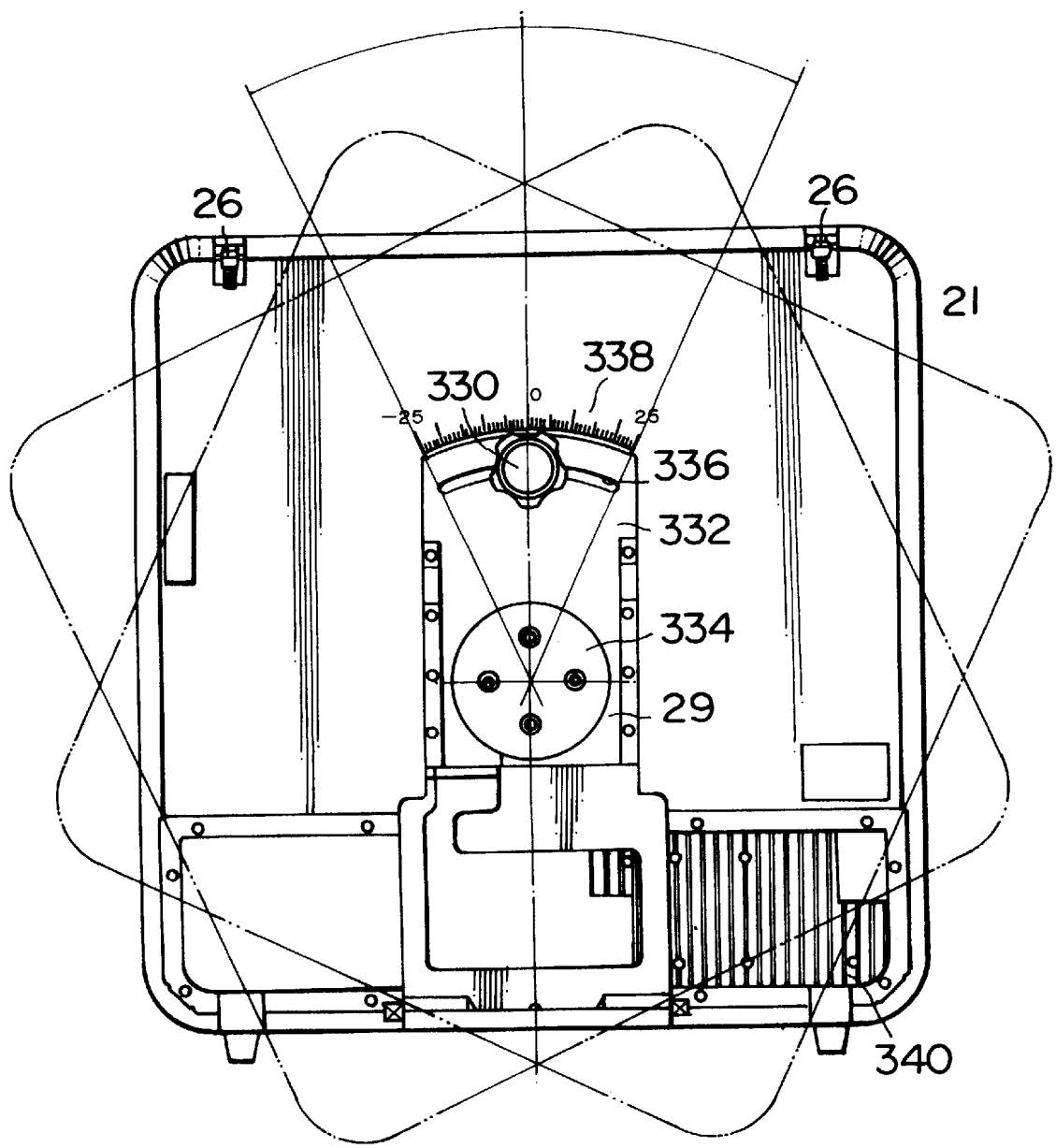

FIGS. 15A, 15B, 15C and 15D show another embodiment. FIG. 15A is a perspective view of this embodiment, FIG. 15B is a right side view of the state where an antenna portion is opened, FIG. 15C is a top view of a body portion in the state where the antenna portion is removed for the sake of explanation, and FIG. 15D is a back view of the antenna portion which is viewed from its back side. There is a large difference from the previous embodiments in the point of having a camera for taking pictures.

In FIGS. 15A to 15D, the reference numeral 20 represents a body portion; 21, an antenna portion; 22, a transmitter/receiver (hereinafter referred to as "handset"); 23, a handset storing portion; 24, a panel portion; 25, a handle for hanging and carrying the portable satellite communication apparatus in hand; 26, a buckle; 27, an elevation angle adjustor; 29, an antenna supporting portion; 31a to 31c, insulators; 33, a lock finger grip; 35, a handling instruction indicating portion; 36, a connector portion; and 370, a connector chamber. The same reference numerals as those used in the previous embodiments represent the same or corresponding parts having the same functions.

In the same manner as in the previous embodiments, with this configuration, it is possible to make the apparatus small-sized and simple as a whole. Since the antenna portion 21 is formed to act as a cover for the body portion 20, it is possible to protect various devices provided on the upper surface of the body portion.

A body portion cover 42 is provided in the body portion 20, and the handset storing portion 23 is provided in this body cover portion 42. A pair of holders 402 are provided in this storing portion 23 so as to fix the handset 22. When the antenna portion 21 which acts as a cover for the body portion 20 is closed, the handset 22 is fixed to the storing portion 23 by the holder 402. On the other hand, when the cover or the antenna portion 21 is opened, the handset 22 is enabled to be pulled out rapidly. In case of occurrence of a disaster, therefore, it is possible to cope with the disaster simply and rapidly.

The elevation angle of this antenna portion 21 can be adjusted by the elevation angle adjustor 27. This elevation angle adjustor 27 is constituted by the lock screw 33 movable along a groove 304 extending from this side to the far side for adjusting the elevation angle, and a support member 302 one end portion of which is rotatably connected to the antenna supporting portion 29 of the antenna portion 21 while the other end portion of which is made slidable in the above-mentioned groove and mechanically connected to the lock screw 33. The elevation angle of the antenna is determined by fixing the support member 302 at a proper sliding position in the groove 304 by means of the lock screw 33. A scale 306 is provided along the elevation angle adjusting groove 304, so that the elevation angle can be set rapidly and simply. An aimed value of the elevation angle is described on the indicating portion 35, so that the elevation angle can be set rapidly on the basis of this aimed value.

In the same manner as in the previous embodiments, an azimuth compass 242 and a level 241 are provided. Connection to external devices and external power supply are performed through connectors provided in the connector storing portion 370. This storing portion is provided in the form of a recess in a side portion of the body portion, so that the connectors can be prevented from being damaged due to hitting on surrounding things.

A hinge mechanism of the antenna supporting portion 29 is fixed at a central far side portion of the body portion 20, and the antenna portion 21 is fixed to this antenna supporting portion 29 so that the antenna portion 21 can be opened and closed. Since the support member 302 of the elevation angle adjustor 27 is fixed to the antenna supporting portion 29 as mentioned above, the elevation angle which is the open/close angle of the antenna portion 21 is fixed.

A high frequency circuit for transmitting signals received by the antenna to a circuit of the body portion and for transmitting signals to be transmitted to the antenna from the circuit of the body portion is provided in the lower portion on the antenna side of this antenna supporting portion 29, and protected by this antenna supporting portion 29.

A polarization angle adjusting mechanism of the antenna is provided in the antenna supporting portion. This polarization angle adjusting mechanism is constituted by a support plate 332 fixed to the antenna supporting portion 29, a groove 336 formed in this support plate 332, a rotary support body 334 and a fixing screw 330. The antenna portion 21 is rotatably held on the support plate 332 by means of the rotary support body 334 so that it is rotated by moving the fixing screw 330 attached to the antennal portion 21, along the groove 336. The fixing screw 330 is screwed down and fixed at the rotation angle where the strength of received radio waves takes the maximum value. The polarization angle can be adjusted on a scale 338 provided, as a target, along the groove 336. The strength of received radio waves is visually indicated on a level indicator 244 constituted by a liquid-crystal indicator.

Figure 16A:
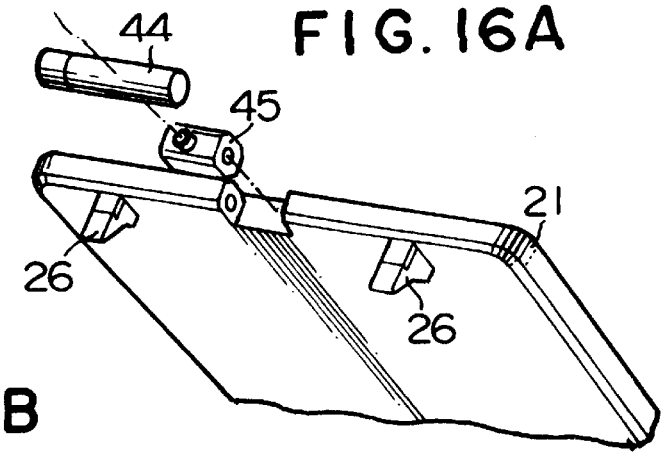
FIGS. 16A, 16B and 16C are partial perspective views illustrating an embodiment of the method and configuration for attachment of a video camera to the portable satellite communication apparatus mentioned above.
Figure 16B:
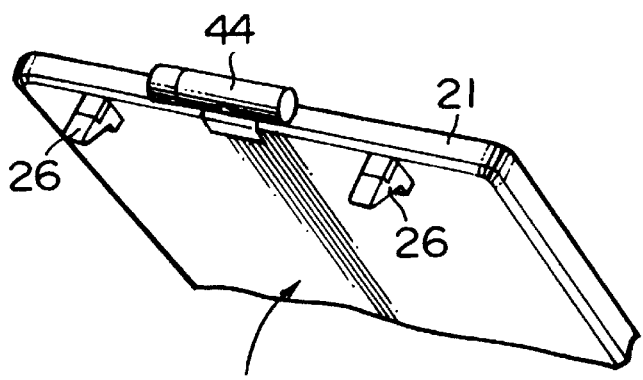
Figure 16C:
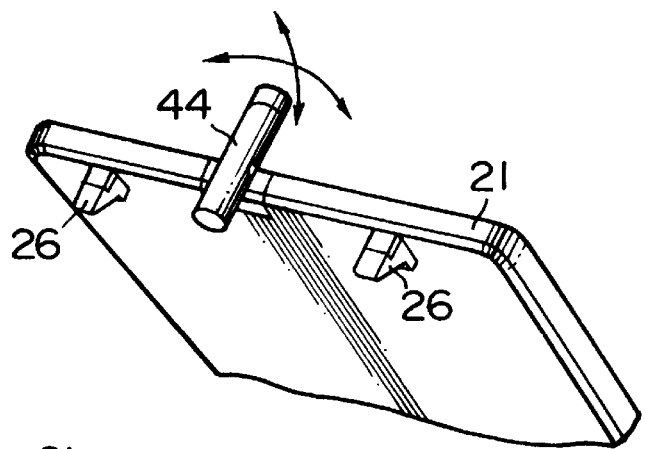
Figure 17:
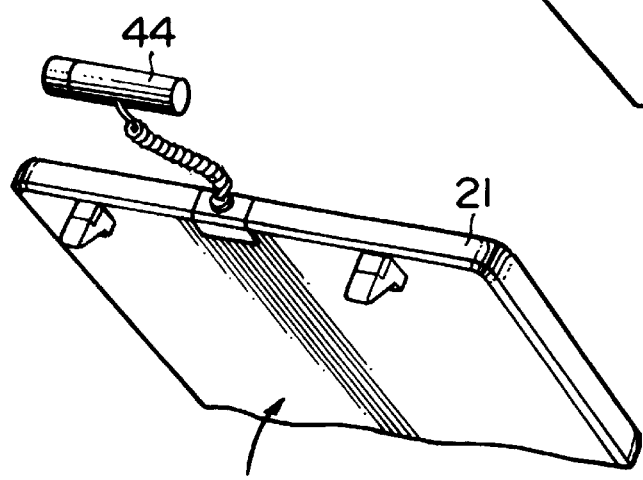
FIG. 17 is a partial perspective view illustrating another embodiment of the method and configuration for attachment of a video camera to the portable satellite communication apparatus mentioned above.

A video camera 44 is provided as a video input means in the antenna portion 21. This is shown in detail in FIGS. 16A, 16B and 16C. A recess storing portion is formed in a center portion of the antenna portion 21, and the camera 44 is attached to this storing portion through a rotary support body 45. As shown in FIGS. 16B and 16C, the camera can be directed to various directions, so that the conditions of a disaster can be informed as a picture. As shown in FIG. 17, the camera is not directly attached to the rotary support body 45, but may be connected through a connection cable. In this case, the direction of taking a picture can be determined freely, but it is necessary to hold the camera by hand.

A body portion cover 42 is provided on the upper surface of the body portion 20, and the inside of the body portion 20 has a water proof structure. In the inside of the body portion 20, a circuit for transmission and reception and an operation control circuit are provided. Therefore, not only a water proof function but also a heat release function are necessary.

Figure 18A:
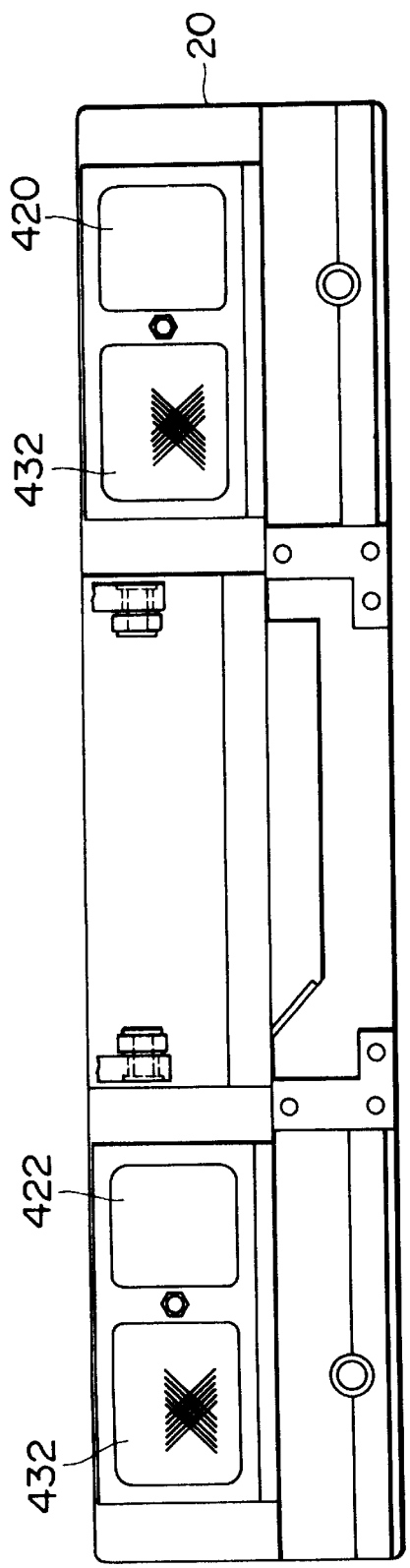
FIGS. 18A, 18B and 18C are a front view, a side view and a side view illustrating the method and configuration for cooling air sucking and air exhausting in the portable satellite communication apparatus mentioned above.
Figure 18C:
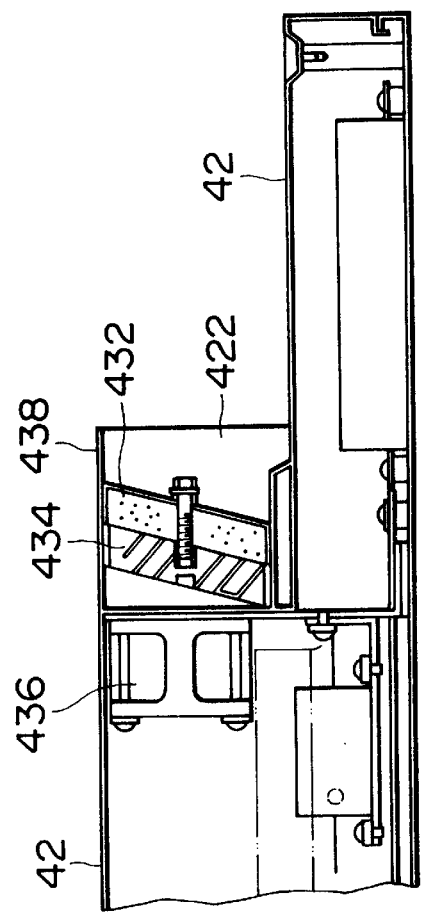
Figure 18B:
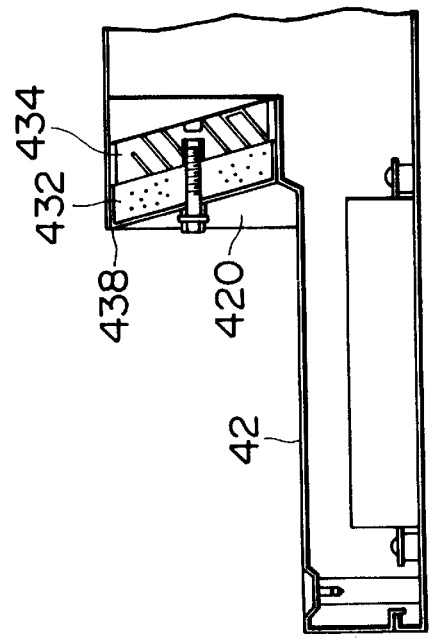

FIG. 18A is a view from the back side which is the opposite side to this side of FIG. 15C. Two openings 420 and 422 are provided in the direction of the antenna supporting portion. With the openings 420 and 422 opened in the direction of the antenna, it is possible to prevent rain or the like by the antenna. FIG. 18B shows a sectional view of the suction opening 420, and FIG. 18C is a sectional view of the exhaust opening portion 422. A filter cover 438 projects toward the outside in the circumferential portion of each opening, and a filter 432 and a slit member 434 are provided inside the filter cover 438. The filter 432 and the slit member 434 are provided to be inclined so that their upper portions project inward and their lower portions project inward. Accordingly, it is possible to prevent water drops from entering the two openings. The slit member 434 has a plurality of inclined slit plates so as to have a function to discharge water drops to the outside. Further, since the outside bottom portion of the filter 432 is made lower, water can flow outside but can not enter.

A motor-driven fan 436 for forcibly exhaust air is provided on the exhaust opening side. Cooling air is sucked through the left suction opening 432 in FIG. 18C, and exhausted through the right exhaust opening 422. This air is made to flow forcibly by means of the motor-driven fan 436. The body portion cover 42 forms a path of the cooling air so as to make effective cooling and improve the function of water proof.

As described above, according to the present invention, a cover of a body portion constitutes an antenna portion, so that the antenna portion can be set to direct toward a communications satellite rapidly and easily. Therefore, even in case of an emergency such as occurrence of a disaster or the like, it is possible to ensure a communication line from the area of the disaster immediately, so that it is possible to collect proper information and give proper instructions.

In the above-mentioned embodiments, if a personal computer or the like is connected to an external connection terminal, it is possible to perform transmission and reception of data, and if an external antenna is used, it is possible to perform more stable communication. Further, if position data of the place where the apparatus is used is supplied from a GPS device or the like, it is possible to exactly indicate azimuth and elevation angles as the set direction of the antenna portion to thereby make it possible to set the antenna portion more easily.

What is claimed is:

1. A portable satellite communication apparatus for performing communication through a predetermined target communications satellite comprising: a body portion provided with an operation device; an antenna portion attached to said body portion so as to be openable for transmitting radio waves toward said target communications satellite and for receiving radio waves from said target communications satellite; and a handset;

at least a target azimuth/elevation value indicator provided on said apparatus to indicate a target azimuth angle value for initial placement of said body portion on a surface for rough initial azimuth aiming of said body portion toward said target communication satellite, and an elevation angle value for rough initial elevational angling of said antenna portion toward said target communications satellite;

an actual azimuth indicator provided on said apparatus to indicate an actual azimuth angle of at least one of said body portion and said antenna portion to facilitate initial said azimuth aiming in conjunction with said target azimuth angle value; and a fine azimuth elevation adjustment arrangement adapted to use electric field strength levels of received said radio waves from said target communications satellite after said initial placement, for fine adjustment of both said azimuth aiming and elevational angling toward said target communications satellite.

2. A portable satellite communication apparatus according to claim 1, wherein said target azimuth/elevation value indication and said actual azimuth indicator are disposed on a side on an upper surface of said body portion, and said handset is stored in a storing portion formed in said body portion so that said handset can be taken out freely from said storing portion.

3. A portable satellite communication apparatus according to claim 1 or 2, wherein a level for indicating a degree of level of said body portion and an indicator to indicate electric field strength of radio waves received from said communications satellite are provided on an upper surface of said body portion.

4. A portable satellite communication apparatus according to claim 1 or 2, wherein a connector portion having an external power supply terminal and an external device connection terminal is further provided on a side surface of said body portion at a portion adjacent to a button surface of said portable satellite communication apparatus is placed.

5. A portable satellite communication apparatus according to claim 4, wherein a connector cover for covering said connector portion is provided on said side surface of said body portion so that when a connection terminal from an external device is connected to said connector portion, said connection terminal from said external device is covered with said connector cover and said connection terminal is adapted to be extended through a space provided between a lower end portion of said connector cover and said bottom surface.

6. A portable satellite communication apparatus for performing communication through a predetermined target communications satellite comprising: a body portion provided with an operation device; an antenna portion electrically connected to said body portion for transmitting radio waves toward said target communications satellite and for receiving radio waves from said communications satellite; and a handset;
at least a target azimuth/elevation value indicator provided on said apparatus to indicate a target azimuth angle value for initial placement of said body portion on a surface for rough initial azimuth aiming of said body portion toward said communication satellite, and an elevation angle value for rough initial elevational angling of said antenna portion toward said target communication satellite;
an actual azimuth provided on said apparatus indicator to indicate an actual azimuth angle of at least one of said body portion and said antenna portion to facilitate said initial azimuth aiming in conjunction with said target azimuth angle value; and
an indicator to indicate electric field strength of radio waves received from said communications satellite;
a fine azimuth elevation adjustment arrangement adapted to sue electric field strength levels of received said radio waves from said target communications satellite after said initial placement, for fine adjustment of both said azimuth aiming and elevational angling toward said target communication satellite; and
a connector portion having an external power supply terminal and an external device connection terminal is provided on a side surface of said body portion, a power supply to be connected to said external power supply terminal being a battery.

7. A portable satellite communication apparatus for performing communication through a communications satellite comprising: a body portion provided therein with a control circuit for controlling satellite communication; an antenna portion attached to said body portion so as to be openable at its side for transmitting radio waves toward said communications satellite and for receiving radio waves from said communications satellite; a handset; a lock mechanism for locking said antenna portion, like a cover, onto an upper portion of said body portion; a device mounted on said body portion to support said antenna portion rotatably; a display portion to display at least a target azimuth and elevation angle of said antenna portion and a handle for carrying, by hand, said body portion and said antenna portion; wherein said handle and said device rotatably supporting said antenna portion are positioned at opposite sides to each other, said display portion being positioned at a side of said handle, said antenna portion being positioned at a side of said device rotatably supporting said antenna portion, and said handset being positioned at a side on a line perpendicular to a line connecting said handle and said device rotatably supporting said antenna portion.

8. A portable satellite communication apparatus according to claim 7, further comprising an antenna support mechanism to hold said antenna portion at a predetermined elevation angle, wherein said antenna support mechanism is positioned at the side of said device rotatably supporting said antenna portion.

9. A portable satellite communication for performing communication through a communications satellite comprising: a body portion provided therein with a control circuit for controlling satellite communication; an antenna portion attached to said body portion so as to be openable at its side for transmitting radio waves toward said communications satellite and for receiving radio waves from said communications satellite; a handset; a lock mechanism for locking said antenna portion, like a cover, onto an upper portion of said body portion; a handle for carrying, by hand, said body portion and said antenna portion; and an antenna support mechanism for holding said antenna portion at a predetermined elevation angle wherein said antenna support mechanism is coupled, through an elevation angle adjusting mechanism, with an azimuth adjusting mechanism rotatably attached to said body portion for adjusting an azimuth angle of said antenna portion in a position above said body portion.

10. A portable satellite communication apparatus according to claim 9, wherein said antenna support mechanism rotatably supports said antenna portion for adjustment of an polarization angle of said antenna portion.

11. A portable satellite communication apparatus according to claim 9, wherein said handle is attached to said body portion so as be able to be stored into inside of said body portion, and said lock mechanism is attached to said body portion so that said lock mechanism releases locking to thereby enable said antenna portion to be opened only when said handle is stored into the inside of said body portion.

12. A portable satellite communication apparatus according to claim 1, wherein said fine azimuth/elevation adjustment arrangement more specifically comprising a device to make a polarization angle of said antenna portion coincide with a direction of a straight polarization of radio waves from said communication satellite, wherein said body portion has a control circuit provided therein and a body-portion cover provided thereon, said body-portion cover having an opening portion with openings for sucking and exhausting cooling air and having air-filters and slit members provided at said opening portion.

13. A portable satellite communication apparatus according to claim 12, wherein said opening portion is directed to a position where said antenna portion is attached to said body portion, and said air filter and said slit member are attached to be inclined in a manner so that the upper portions thereof project outward and the lower portions project inward.

14. A portable satellite communication apparatus according to claim 12, wherein projection portions are provided on outer circumferences of said air filters and said slit members so as to project outward.

15. A portable satellite communication apparatus according to claim 1, wherein said fine azimuth/elevation adjustment arrangement more specifically comprising a device to make a polarization angle of said antenna portion coincide with a direction of a straight polarization of a radio waves from said communication satellite, wherein said body portion has a control circuit provided therein and a body-portion cover provided thereon, said body-portion cover has an opening portion with openings for sucking and exhausting cooling air, air filters and slit members provided at said openings, and a motor-driven fan is provided in said opening portion.

16. A portable satellite communication apparatus according to claim 15, wherein said opening portion is directed to a position where said antenna portion is attached to said body portion, and said air filters and said slit members are attached to be inclined in a manner so that the upper portions thereof project outward and the lower portions thereof project inward.

17. A portable satellite communication apparatus according to claim 16, wherein projection portions are provided on outer circumferences of said air filters and said slit members so as to project outward.

18. A portable satellite communication apparatus according to claim 15, wherein a recess portion is provided in said body-portion cover and an elevation angle adjustor for adjusting an elevation angle of said antenna portion is provided in said recess portion.

19. A portable satellite communication apparatus according to claim 18, wherein a groove is provided in said recess portion of said body-portion cover so as to extend to the far side from this side, an elevation angle adjustment scale is provided along said groove, and said elevation angle adjustor has a screw lock mechanism movable along said groove and a support member mechanically connected to said screw lock portion and said antenna portion so that the elevation angle of said antenna portion is changed by said support member when said screw lock mechanism is slid along said groove and the elevation angle of said antenna portion is fixed when said screw lock mechanism is fixed by a screw of said screw lock mechanism at a desired position in said groove.

20. A portable satellite communication apparatus according to claim 6, further comprising a device to make a polarization angle of said antenna portion coincide with a direction of a straight polarization of radio waves from said communication satellite, wherein said body portion has a control circuit provided therein and a body-portion cover provided thereon, said body-portion cover having an opening portion with openings for sucking and exhausting cooling air and having air-filters and slit members provided at said opening portion.

21. A portable satellite communication apparatus according to claim 20, wherein said opening portion is directed to a position where said antenna portion is attached to said body portion, and said air filter and said slit member are attached to be inclined in a manner so that upper portions thereof project outward and lower portions project inward.

22. A portable satellite communication apparatus according to claim 20, wherein projection portions are provided on outer circumferences of said air filters and said slit members so as to project outward.

23. A portable satellite communication apparatus according to claim 6, further comprising a device to make a polarization angle of said antenna portion coincide with a direction of a straight polarization of radio waves from said communication satellite, wherein said body portion has a control circuit provided therein and a body-portion cover provided thereon, said body-portion cover has an opening portion with openings for sucking and exhausting cooling air, air filters and slit members provided at said openings, and a motor-driven fan is provided in said opening portion.

24. A portable satellite communication apparatus according to claim 23, wherein said opening portion is directed to a position where said antenna portion is attached to said body portion, and said air filters and said slit members are attached to be inclined in a manner so that upper portions thereof project outward and lower portions thereof project inward.

25. A portable satellite communication apparatus according to claim 24, wherein projection portions are provided on outer circumferences of said air filters and said slit members so as to project outward.

26. A portable satellite communication apparatus according to claim 23, wherein a recess portion is provided in said body-portion cover and an elevation angle adjustor for adjusting an elevation angle of said antenna portion is provided in said recess portion.

27. A portable satellite communication apparatus according to claim 26, wherein a groove is provided in said recess portion of said body-portion cover so as to extend to a far side from this side, an elevation angle adjustment scale is provided along said groove, and said elevation angle adjustor has a screw lock mechanism movable along said groove and a support member mechanically connected to said screw lock portion and said antenna portion so that an elevation angle of said antenna portion is changed by said support member when said screw lock mechanism is slid along said groove and the elevation angle of said antenna portion is fixed when said screw lock mechanism is fixed by a screw of said screw lock mechanism at a desired position in said groove.

28. A portable satellite communication apparatus according to claim 7, further comprising a device to make a polarization angle of said antenna portion coincide with a direction of a straight polarization of radio waves from said communication satellite, wherein said body portion has a control circuit provided therein and a body-portion cover provided thereon, said body-portion cover having an opening portion with openings for sucking and exhausting cooling air and having air-filters and slit members provided at said opening portion.

29. A portable satellite communication apparatus according to claim 28, wherein said opening portion is directed to a position where said antenna portion is attached to said body portion, and said air filter and said slit member are attached to be inclined in a manner so that upper portions thereof project outward and lower portions project inward.

30. A portable satellite communication apparatus according to claim 28, wherein projection portions are provided on outer circumferences of said air filters and said slit members so as to project outward.

31. A portable satellite communication apparatus according to claim 7, further comprising a device to make a polarization angle of said antenna portion coincide with a direction of a straight polarization of radio waves from said communication satellite, wherein said body portion has a control circuit provided therein and a body-portion cover provided thereon, said body-portion cover has an opening portion with openings for sucking and exhausting cooling air, air filters and slit members provided at said openings, and a motor-driven fan is provided in said opening portion.

32. A portable satellite communication apparatus according to claim 31, wherein said opening portion is directed to a position where said antenna portion is attached to said body portion, and said air filters and said slit members are attached to be inclined in a manner so that upper portions thereof project outward and lower portions thereof project inward.

33. A portable satellite communication apparatus according to claim 32, wherein projection portions are provided on outer circumferences of said air filters and said slit members so as to project outward.

34. A portable satellite communication apparatus according to claim 31, wherein a recess portion is provided in said body-portion cover and an elevation angle adjustor for adjusting an elevation angle of said antenna portion is provided in said recess portion.

35. A portable satellite communication apparatus according to claim 34, wherein a groove is provided in said recess portion of said body-portion cover so as to extend to a far side from this side, an elevation angle adjustment scale is provided along said groove, and said elevation angle adjustor has a screw lock mechanism movable along said groove and a support member mechanically connected to said screw lock portion and said antenna portion so that an elevation angle of said antenna portion is changed by said support member when said screw lock mechanism is slid along said groove and the elevation angle of said antenna portion is fixed when said screw lock mechanism is fixed by a screw of said screw lock mechanism at a desired position in said groove.

36. A portable satellite communication apparatus according to claim 9, further comprising a device to make a polarization angle of said antenna portion coincide with a direction of a straight polarization of radio waves from said communication satellite, wherein said body portion has a control circuit provided therein and a body-portion cover provided thereon, said body-portion cover having an opening portion with openings for sucking and exhausting cooling air and having air-filters and slit members provided at said opening portion.

37. A portable satellite communication apparatus according to claim 36, wherein said opening portion is directed to a position where said antenna portion is attached to said body portion, and said air filter and said slit member are attached to be inclined in a manner so that upper portions thereof project outward and lower portions project inward.

38. A portable satellite communication apparatus according to claim 36, wherein projection portions are provided on outer circumferences of said air filters and said slit members so as to project outward.

39. A portable satellite communication apparatus according to claim 9, further comprising a device to make a polarization angle of said antenna portion coincide with a direction of a straight polarization of radio waves from said communication satellite, wherein said body portion has a control circuit provided therein and a body-portion cover provided thereon, said body-portion cover has an opening portion with openings for sucking and exhausting cooling air, air filters and slit members provided at said openings, and a motor-driven fan is provided in said opening portion.

40. A portable satellite communication apparatus according to claim 39, wherein said opening portion is directed to a position where said antenna portion is attached to said body portion, and said air filters and said slit members are attached to be inclined in a manner so that upper portions thereof project outward and lower portions thereof project inward.

41. A portable satellite communication apparatus according to claim 40, wherein projection portions are provided on outer circumferences of said air filters and said slit members so as to project outward.

42. A portable satellite communication apparatus according to claim 39, wherein a recess portion is provided in said body-portion cover and an elevation angle adjustor for adjusting an elevation angle of said antenna portion is provided in said recess portion.

43. A portable satellite communication apparatus according to claim 42, wherein a groove is provided in said recess portion of said body-portion cover so as to extend to a far side from this side, an elevation angle adjustment scale is provided along said groove, and said elevation angle adjustor has a screw lock mechanism movable along said groove and a support member mechanically connected to said screw lock portion and said antenna portion so that an elevation angle of said antenna portion is changed by said support member when said screw lock mechanism is slid along said groove and the elevation angle of said antenna portion is fixed when said screw lock mechanism is fixed by a screw of said screw lock mechanism at a desired position in said groove.

44. A portable satellite communication apparatus according to claim 1, wherein said fine azimuth/elevation adjustment arrangement more specifically comprising a device to make a polarization angle of said antenna portion coincide with a direction of a straight polarization of radio waves from said communication satellite.

45. A portable satellite communication apparatus according to claim 6, further comprising a device to make a polarization angle of said antenna portion coincide with a direction of a straight polarization of radio waves from said communication satellite.

46. A portable satellite communication apparatus according to claim 9, further comprising a device to make a polarization angle of said antenna portion coincide with a direction of a straight polarization of radio waves from said communication satellite.

47. A portable satellite communication apparatus for performing communication through a predetermined target communications satellite comprising: a body portion provided with an operation device; an antenna portion detachable from said body portion for transmitting radio waves toward said target communications satellite and for receiving radio waves from said target communications satellite; and a handset;

at least a target azimuth/elevation value indicator provided on said apparatus to indicate a target azimuth angle value for initial placement of said antenna portion on a surface for rough initial azimuth aiming of said antenna portion toward said target communication satellite, and an elevation angle value for rough initial elevational angling of said antenna portion toward said target communications satellite;

an actual azimuth indicator provided on said apparatus to indicate an actual azimuth angle of said antenna portion to facilitate initial said azimuth aiming in conjunction with said target azimuth angle value; and a fine azimuth elevation adjustment arrangement adapted to use electric field strength levels of received said radio waves from said target communications satellite after said initial placement for fine adjustment of said azimuth aiming and elevational angling toward said target communications satellite.

* * * * *